United States Patent
Chatterjee et al.

(10) Patent No.: US 8,638,910 B2
(45) Date of Patent: Jan. 28, 2014

(54) INTEGRATION OF ENTERPRISE VOICEMAIL IN MOBILE SYSTEMS

(75) Inventors: Saurav Chatterjee, San Jose, CA (US); John Drewry, San Jose, CA (US); Paul Fullarton, San Jose, CA (US); Josh Perfetto, San Jose, CA (US); Hemendra Rana, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1737 days.

(21) Appl. No.: 11/651,223

(22) Filed: Jan. 8, 2007

(65) Prior Publication Data

US 2007/0207785 A1 Sep. 6, 2007

Related U.S. Application Data

(63) Continuation-in-part of application No. 10/890,922, filed on Jul. 14, 2004.

(60) Provisional application No. 60/487,143, filed on Jul. 14, 2003, provisional application No. 60/756,686, filed on Jan. 6, 2006.

(51) Int. Cl.
*H04M 11/00* (2006.01)
*H04W 4/12* (2009.01)

(52) U.S. Cl.
USPC ..................... 379/88.18; 455/412.1

(58) Field of Classification Search
USPC ............... 379/88.18, 211.02; 455/412.1
See application file for complete search history.

(56) References Cited

U.S. PATENT DOCUMENTS

| | | |
|---|---|---|
| 5,732,348 A | 3/1998 | Norimatsu |
| 5,903,629 A | 5/1999 | Campbell |
| 6,092,097 A | 7/2000 | Suzuoka |
| 6,147,977 A | 11/2000 | Thro |
| 6,272,214 B1 | 8/2001 | Jonsson |
| 6,345,288 B1 | 2/2002 | Reed |
| 6,351,656 B1 | 2/2002 | Burgan |
| 6,373,817 B1 | 4/2002 | Kung |

(Continued)

FOREIGN PATENT DOCUMENTS

WO  WO 03/085946 A1  10/2003

OTHER PUBLICATIONS

PCT International Search Report, International Application No. PCT/US2006/033181, Apr. 25, 2007.

(Continued)

*Primary Examiner* — Rasha Al Aubaidi
(74) *Attorney, Agent, or Firm* — Tucker Ellis LLP

(57) ABSTRACT

An integrated voicemail system is described that provides "visual voicemail" that overcomes the shortcomings associated with a user having to dial into a voicemail system and navigate through a menu of options using conventional voice and/or standard DTMF signaling-based browsing capabilities. The visual voicemail instead provides, via a client device of the user's choice, a visual presentation of a user's voicemails along with state information of the voicemails. The visual presentation of the voicemails includes a user interface that allows a user to control or manipulate voicemails from the client device, where the manipulation includes playing, pausing, rewinding, fast-forwarding, deleting, and changing a state of each voicemail. The visual voicemail also eliminates the need for a user to periodically call-in to the enterprise voicemail system in order to check for voicemail messages as the messages can be automatically delivered to the user's client device.

35 Claims, 19 Drawing Sheets

(56) References Cited

U.S. PATENT DOCUMENTS

| | | |
|---|---|---|
| 6,424,711 B1 | 7/2002 | Bayless |
| 6,751,297 B2 | 6/2004 | Nelkenbaum |
| 6,754,181 B1 | 6/2004 | Elliott |
| 6,792,085 B1 * | 9/2004 | Rigaldies et al. ......... 379/88.13 |
| 6,920,486 B2 | 7/2005 | Kiiskinen |
| 6,987,840 B1 * | 1/2006 | Bosik et al. ............... 379/88.17 |
| 2003/0120593 A1 | 6/2003 | Bansal |
| 2004/0248600 A1 | 12/2004 | Kim |
| 2005/0041647 A1 | 2/2005 | Stinnie |
| 2005/0068980 A1 | 3/2005 | Mathew |
| 2005/0186945 A1 | 8/2005 | Mazor |
| 2005/0272413 A1 | 12/2005 | Bourne |
| 2006/0141982 A1 | 6/2006 | Timmins |
| 2006/0234680 A1 * | 10/2006 | Doulton ................... 455/412.1 |
| 2007/0022058 A1 | 1/2007 | Labrou |

OTHER PUBLICATIONS

Written opinion of the International Searching Authority for Application No. PCT/US2006/033181, submitted on Jan. 15, 2009.

PCT International Search Report, International Application No. PCT/US2006/033071, Apr. 20, 2007.

PCT International Search Report, International Application No. PCT/US2007/000487, Oct. 18, 2007.

PCT International Search Report, International Application No. PCT/US2007/007064, Jun. 30, 2008.

Extended European Search Report for EP 07709640.2 dated Aug. 17, 2012.

* cited by examiner

| Req. | Icon | Title | Description |
|---|---|---|---|
| 1 | △ | Play | Starts/resumes playing the voice message from current location. Not visible if already in playing mode. |
| 2 | ☐ | Pause | Pauses playing at current location. Only visible if in playing mode. |
| 3 | ▣ | Stop | Stops playing and resets position to start of message. Disabled or dimmed if already stopped. |
| 4 | » | Skips forward | Skips forward 5 seconds or to end of message if less that 5 seconds remaining. |
| 5 | « | Skips backward | Skips backward 5 seconds or to start of message if less than 5 seconds from start of message. |

*Fig. 8C*

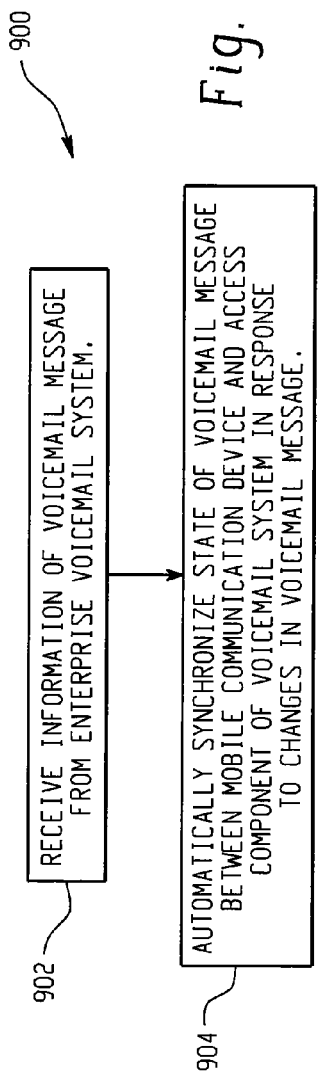

*Fig. 9*

| | |
|---|---|
| Alert ID | AC-1a |
| Purpose | Notifies receiver of Active Call request. |
| Type | Request |
| Originator | End User, Caller |
| Originator's phone no. | Caller defined at UI.<br>Default is Caller's handset phone number |
| Display Text | N/A |
| Priority | Caller defined at UI. |
| Text subject | Caller defined at UI. |
| Voice subject | Caller defined at UI. |
| Expiration | Caller defined at UI as [HH:MM, or wall clock time].<br>Default is 180 minutes |
| Response Options | 1. Accept call request with recipient's handset phone number (this is the default response)<br>2. Accept call request with phone number input by recipient<br>3. Initiate mobile call to originator using the value in the originator's phone number field<br>4. Postpone<br>   a. 15 minutes<br>   b. 60 minutes<br>   c. User defined interval<br>   d. User defined wall clock time<br>5. Respond with predefined text message<br>6. Initiate a Voice IM to originator<br>7. Delete |

*Fig. 11*

| | |
|---|---|
| Alert ID | AC-1b |
| Purpose | Informs caller that recipient has accepted his Active Call request. |
| Type | Response |
| Originator | End User, Recipient |
| Display Text | N/A |
| Priority | N/A |
| Text subject | AMC generated message:"<recipient's name> accepted your call request at <time recipient responded>". |
| Voice subject | N/A |
| Expiration | Expiration time of associated AC-1a message. |
| Recipient's Number | Phone number provided by AC-1a recipient |
| Response Options | 1. Initiate mobile call (using the value in the recipient's number field)<br>2. Delete |

Fig. 12

| | |
|---|---|
| Alert ID | ON-1a |
| Purpose | Active call request to a non-AMC person. |
| Type | Request |
| Originator | AMC subscriber |
| Display Text | N/A |
| Priority | Caller defined at UI. |
| Text subject | Caller defined at UI. |
| Voice subject | N/A |
| Expiration | Caller defined at UI as [HH:MM] not to exceed 72 hours. Default is 3 hours. |
| Phone Number | Caller defined at UI. Default is originator's mobile handset phone number. |
| Response Options | N/A |

Fig. 13

INTEGRATION OF ENTERPRISE VOICEMAIL IN MOBILE SYSTEMS

RELATED APPLICATIONS

This application is a continuation-in-part (CIP) application of U.S. patent application Ser. No. 10/890,922, filed Jul. 14, 2004, which claims the benefit of U.S. Patent Application No. 60/487,143, filed Jul. 14, 2003.

This application claims the benefit of U.S. Patent Application No. 60/756,686, filed Jan. 6, 2006.

This application is related to U.S. patent application Ser. No. 11/509,109, filed Aug. 23, 2006, which claims the benefit of U.S. Patent Application Nos. 60/710,998, 60/711,051, and 60/711,053, all filed Aug. 23, 2005.

This application is related to U.S. patent application Ser. No. 11/509,474, filed Aug. 23, 2006, which claims the benefit of U.S. Patent Application Nos. 60/710,998, 60/711,051, and 60/711,053, all filed Aug. 23, 2005.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIGS. 8A, 8B, and 8C show aspects of the visual voicemail presentation on a client device, under an embodiment.

FIG. 9 is a flow diagram of integrated communications between mobile communication devices and enterprise voicemail systems, under an embodiment.

FIG. 11 is a template of the Notification of Active Call Request alert message (AC-1a), under an embodiment.

FIG. 12 is a template of the Notification of Active Call Request Acceptance alert message (AC-1b), under an embodiment.

FIG. 13 is a template of the Active Call Request to a Non-Subscriber (ON-1a), under an embodiment.

DETAILED DESCRIPTION

Figure 1:
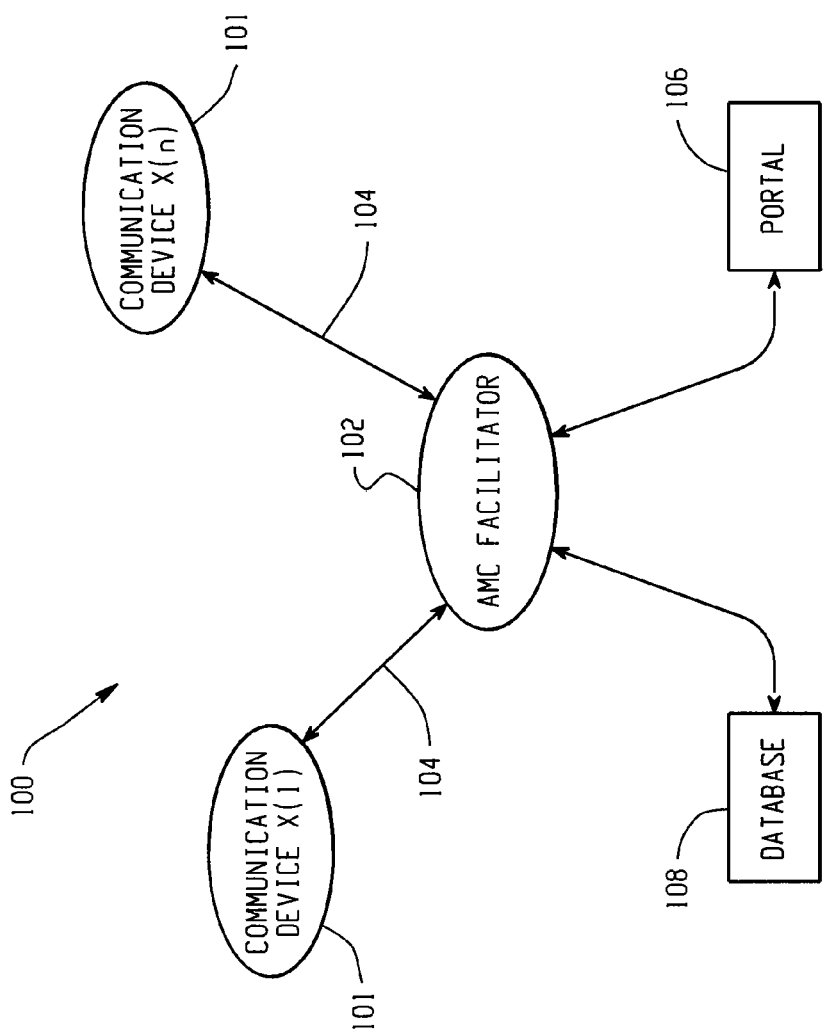
FIG. 1 is a block diagram of an active mobile collaboration (AMC) system, under an embodiment.

A communication system is described herein that integrates mobile communication devices with enterprise voicemail systems. The system and corresponding methods described below include receiving information of a voicemail message from a voicemail system. The voicemail system is a server-based system of an enterprise. The voicemail message is received at the voicemail system via conventional methods. The communication system of an embodiment automatically synchronizes a state of the voicemail message between a mobile communication device and an access component of the voicemail system in response to changes in the voicemail message. The changes in the voicemail message are made via one or more of the mobile communication device and the access component. In addition to synchronizing state (including deleting voicemail from the external mobile communication device), the embodiment enables the user to respond to a voicemail via a phone call, a text message, a SMS, voice IM, or email.

The integrated voicemail described below provides "visual voicemail" that overcomes the shortcomings associated with a user having to dial into a voicemail system and navigate through a menu of options using conventional voice and/or standard Dual Tone Multi-Frequency (DTMF) signaling-based browsing capabilities. The visual voicemail instead provides, via a client device of the user's choice, a visual presentation of a user's voicemails along with state information of the voicemails. The visual presentation of the voicemails includes a user interface that allows a user to control or manipulate voicemails from the client device, where the manipulation includes playing, pausing, rewinding, fast-forwarding, deleting, and changing a state of each voicemail. The visual voicemail also eliminates the need for a user to periodically call-in to the enterprise voicemail system in order to check for voicemail messages as the messages can be automatically delivered to the user's client device as described below.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

A communication system is provided herein that uses client-server architectures to improve the efficiency of multiple types of communications. The communication system, referred to herein as the active mobile collaboration (AMC) system, includes a facilitator. The facilitator of an embodiment is an application hosted on one or more servers or other processor-based devices, and communicates a portable or mobile communications device via one or more couplings. The facilitator communicates with the AMC client of a host portable device via a network coupling for example. The facilitator of alternative embodiments can be distributed among one or more portable processor-based devices including the same communication devices as the client application.

The AMC system also includes a client. The client, also referred to as the AMC client, is a component application of a variety of processor-based mobile communication devices and telephones. The components of the AMC system function to improve efficiency of communications by allowing communication device users to increase accessibility of enterprise and personal contact information from mobile phones and other personal digital assistants (PDAs), dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal information (e.g., voicemail, contacts, calendars, etc.) from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, portable communication devices, subscriber devices or units, PDAs, mobile devices, wireless devices, wireline devices, voice over Internet Protocol (VOIP) devices, private branch exchange (PBX) devices, soft clients, and desktop clients to name a few. The communication devices 101, also referred to as handsets, client devices, mobile devices, mobile communication devices, and portable communication devices, can include all such devices and equivalents, and are not limited to the communication devices described above.

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet.

Figure 2:
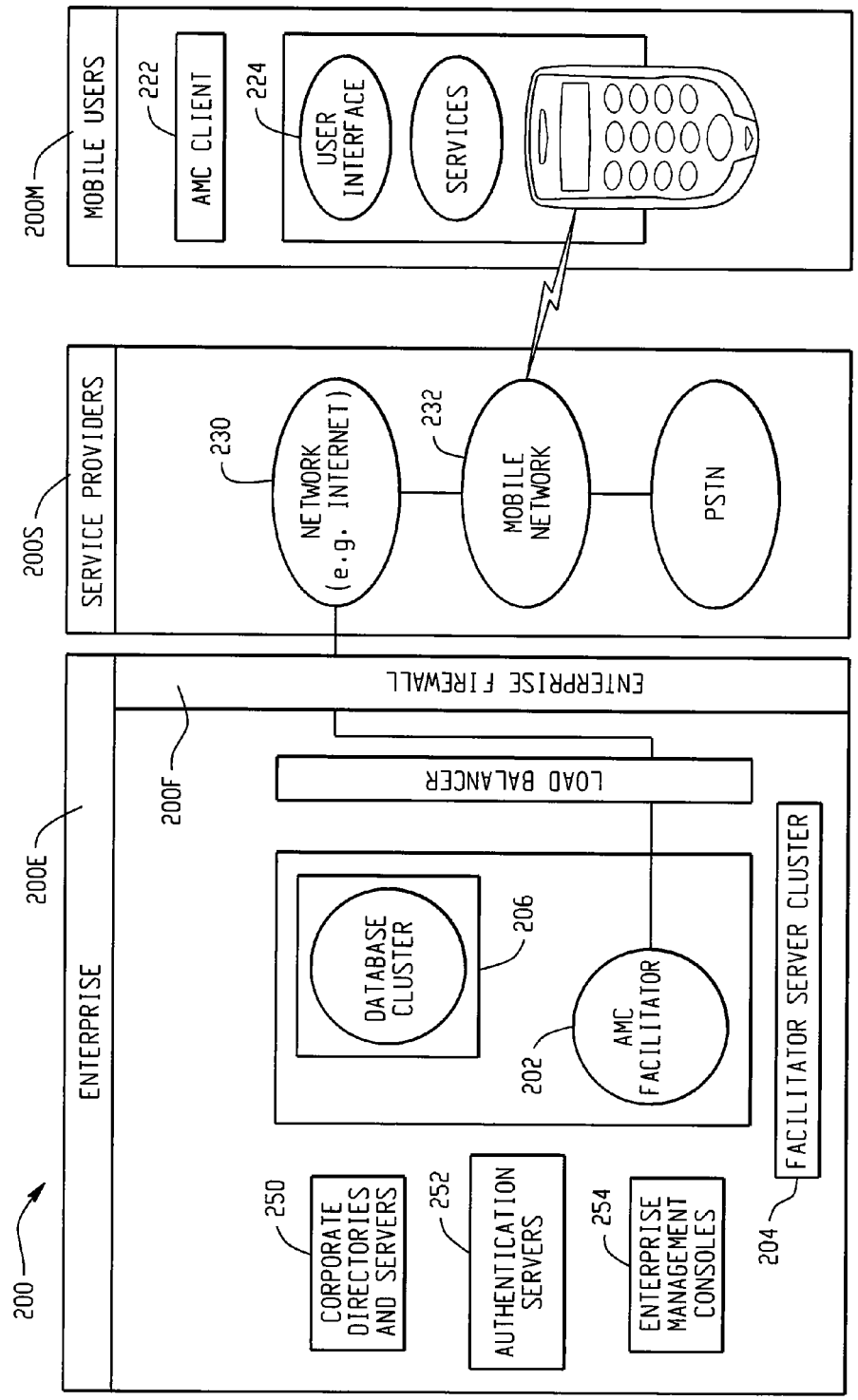
FIG. 2 is a block diagram of a communications system that includes an AMC system, under an alternative embodiment.

FIG. 2 is a block diagram of a communications system 200 that includes an AMC system, under an alternative embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a device of one or more users via one or more network couplings. As an example, the facilitator 202 couples to devices using one or more service provider networks 200S. In this example, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes voicemail information (e.g., voicemail messages), contact information, directory information, calendar information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular mobile devices, and leverages the latest application development environments including Symbian OS, Java and BREW to name a few).

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the mobile device native phonebook, and provide data coupling between those sources and mobile devices hosting the AMC client. This contact information is managed by providing the user with access via the mobile device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook, as described in detail below.

Figure 3A:
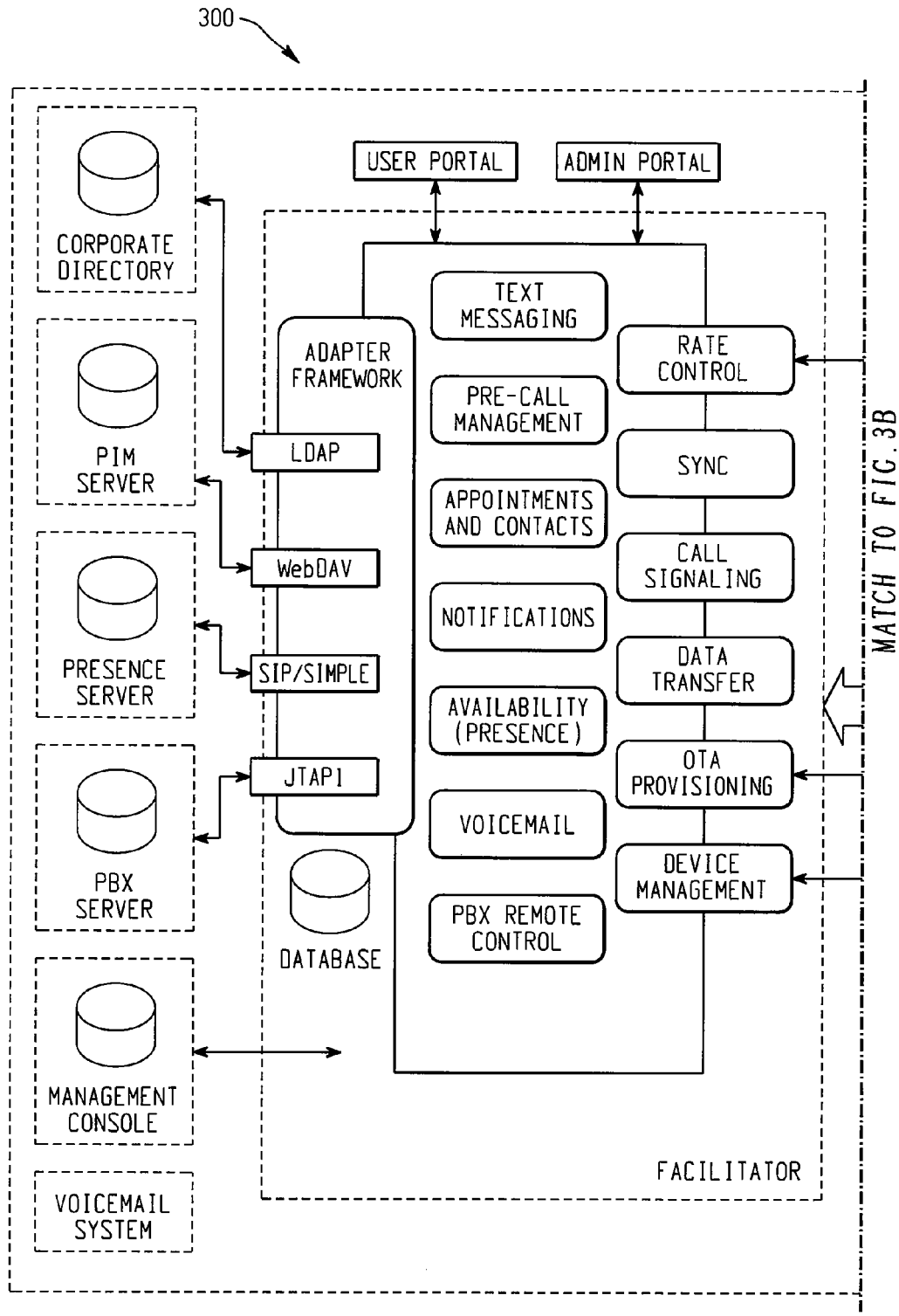
FIG. 3 is a block diagram of a communications system that includes an AMC system, under another alternative embodiment.
Figure 3B:
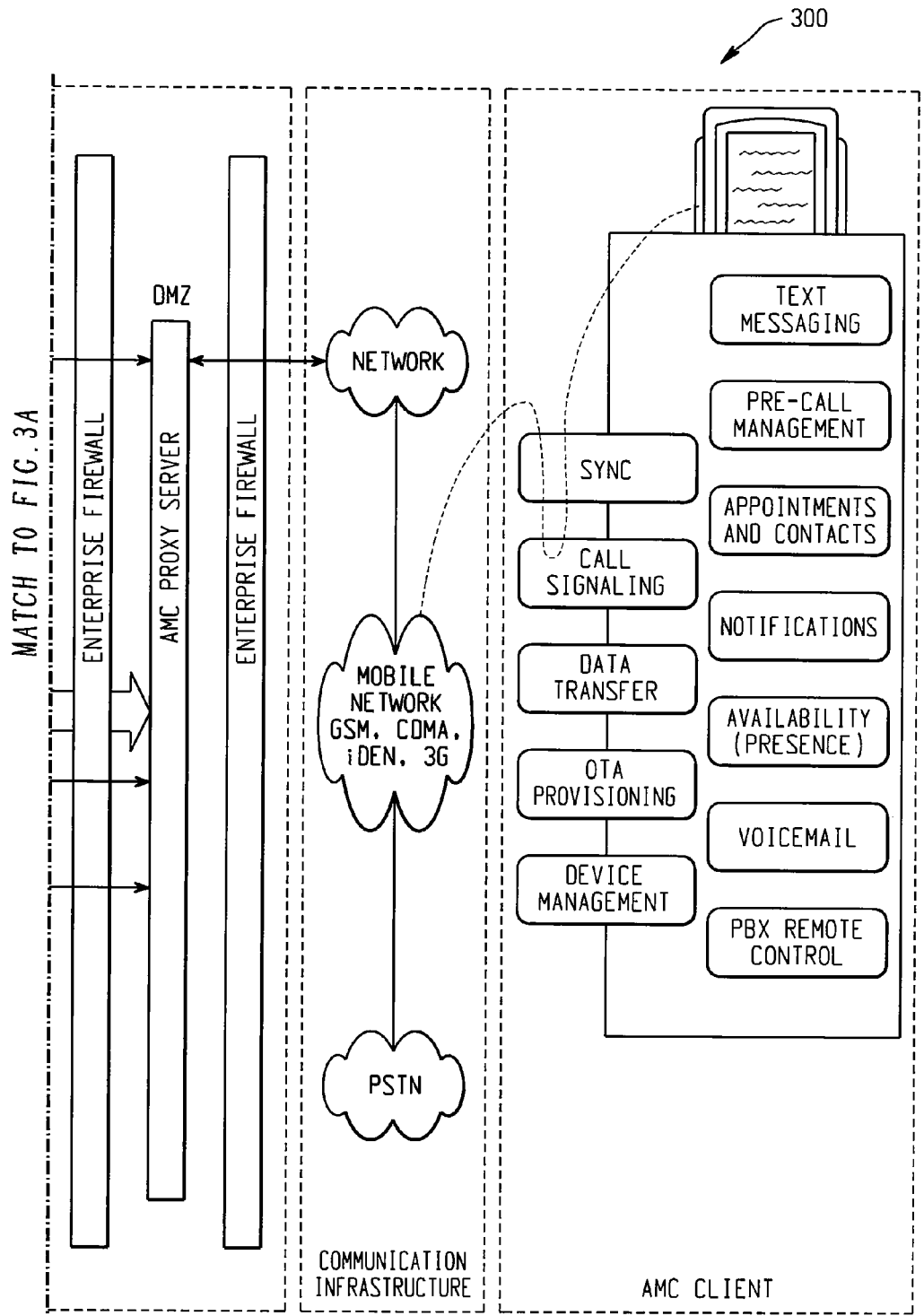

FIG. 3 is a block diagram of a communications system 300 that includes an AMC system, under another alternative embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, management console, and voicemail system (e.g., voicemail servers), to name a few.

The AMC system includes a facilitator as described herein. The facilitator includes an adapter or adapter framework by which the facilitator simultaneously integrates with components of the enterprise and enterprise servers. The facilitator uses an adapter for each enterprise component to which it integrates. The adapter of an embodiment is a protocol-specific adapter for each enterprise component to which it integrates; alternatively, the adapter includes vendor-specific adapters. The facilitator integrates with multiple components simultaneously. The AMC adapters convert the data from the enterprise components (e.g. external) into a common data structure.

The facilitator includes one or more applications that support multiple functions provided by the AMC system. The AMC system functions include integrated access to enterprise voicemail as described here and, additionally, text messaging, pre-call management, appointments and contacts, notifications, availability (presence), voicemail, and PBX remote control as described in the Related Applications.

The facilitator couples to a client device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the client devices, provides a coupling to individual client devices.

Communications between the facilitator and the client device are controlled by the facilitator using one or more components and applications. The functions provided by the facilitator in controlling communications include one or more of rate control, synchronization (sync), call signaling, data transfer, over the air (OTA) provisioning, and device management to name a few. Optionally, the communications path between the facilitator and the communications network includes an AMC proxy server.

The AMC system of an embodiment described above extends the reach of the corporate voicemail to portable electronic devices through integration of the client device with the enterprise voicemail systems. The AMC system thus provides access via a user's client device to some or all of the features available from the user's desk telephone or enterprise telephone. The user's client device includes but is not limited to client devices operating inside the enterprise (e.g., Internet Protocol (IP) telephones, WiFi devices, etc.) as well as client devices operating external to the enterprise (e.g., cellular telephones, wireless devices, personal digital assistants, Worldwide Interoperability for Microwave Access (WiMAX) devices, WiFi devices, etc.). The enterprise voicemail system including the user's desk telephone or enterprise telephone includes but is not limited to PBX systems and central exchange (Centrex) systems. The integration of the AMC system with the enterprise voicemail systems is a two-way integration in which updates to voicemail message box states and message states at the voicemail server (e.g., enterprise) are reflected on the client device, and updates to voicemail message box states and message states made at the client device are reflected on the enterprise voicemail server. The features of the enterprise telephone system available via the client device are described below first in the context of usage patterns.

A usage example under an embodiment includes a user receiving a voicemail at the enterprise voicemail system. Information of the voicemail message is gathered by the facilitator, which in turn propagates it to the AMC client which, in response to the voicemail, displays or presents a view with the voicemail notification on the client device. The voicemail notification includes identification information of the originator of the voicemail message, including phone number and name. The AMC client presents the user with both response options and playback options, depending on the caller identification and/or AMC subscriber status of the caller leaving the "new" voicemail message. The response options include responding to the voicemail originator via telephone call, email message, instant message, and/or voice instant message or forwarding the voicemail. The voicemail playback options include manipulation of the voicemail message via the user interface of the client device, the manipulations including playing, pausing, rewinding, and fast-forwarding the voicemail message as described in detail below. Because the user is notified via the client device of voicemail messages waiting in the enterprise voicemail system, the user is not required to dial-in to the enterprise system to access voicemail information.

Another usage example under an embodiment includes a user playing a voicemail message via the AMC client of the client device. As in conventional voicemail systems, the user can dial into the voicemail system from the client device and use standard DTMF signaling-based browsing capabilities to manipulate (e.g., play) all voicemail. However, the AMC system alternatively allows the user to play a specific voicemail message using the AMC client. When playing voicemail with the AMC system, the AMC client downloads an audio voicemail file from the AMC facilitator and plays the downloaded voicemail at the client device. The facilitator of an embodiment converts the content type of the voicemail message to an audio format best for the client device before or simultaneous with file transmission to the client. Playback of the voicemail message also includes options to pause, rewind, and fast-forward the voicemail during playback. The AMC system changes the voicemail notification state from "unread" to "read" in response to the downloading and/or playing from the client device and propagates the changed state information to the enterprise voicemail system.

Another usage example of an embodiment includes use of the AMC application to respond to a voicemail message. When responding to a voicemail message, the AMC system allows a user to generate and send from the user's client device a call request or a text message to the caller. Furthermore, if the caller's telephone number is known, the user may dial the caller.

The AMC system also allows a user to delete voicemail messages from the enterprise telephone system using the AMC client. In response to user action to delete a voicemail message via the AMC client, the voicemail message is deleted from the enterprise voicemail system and deleted from the AMC system.

If not deleted, voicemail messages eventually expire in the AMC system as described herein. Upon expiration of a voicemail message in the AMC system, the voicemail appears on the client device via the AMC client as an expired conversation, but remains available to be played. After a period of time, the expired conversation cleanup of the AMC system deletes the voicemail notification from the AMC client. In one embodiment, the message continues to be available in the voicemail server so that the enterprise telephone system can allow the user to play the voicemail; in another, the VM is moved to an archive location, but deleted from the VM system.

The voicemail integration of the AMC system includes integration of the enterprise voicemail server to the AMC facilitator and integration of the user voicemail interaction with AMC client interaction. This integration is described in detail below.

Integration of the enterprise voicemail server to the AMC facilitator includes synchronization between the enterprise voicemail server and the AMC system such that any changes to voicemails introduced via any interface to the voicemail system are propagated to any other interface. Thus, for example, changes introduced to a voicemail via a desk telephone are propagated to one or more of a unified messaging client and the AMC system (e.g., client device). Similarly, changes introduced to a voicemail via a unified messaging client are propagated to one or more of the desk telephone and the AMC system (e.g., client device). Likewise, changes introduced to a voicemail via the AMC system (e.g., client device) are propagated to one or more of the desk telephone and the unified messaging client.

Figure 4:
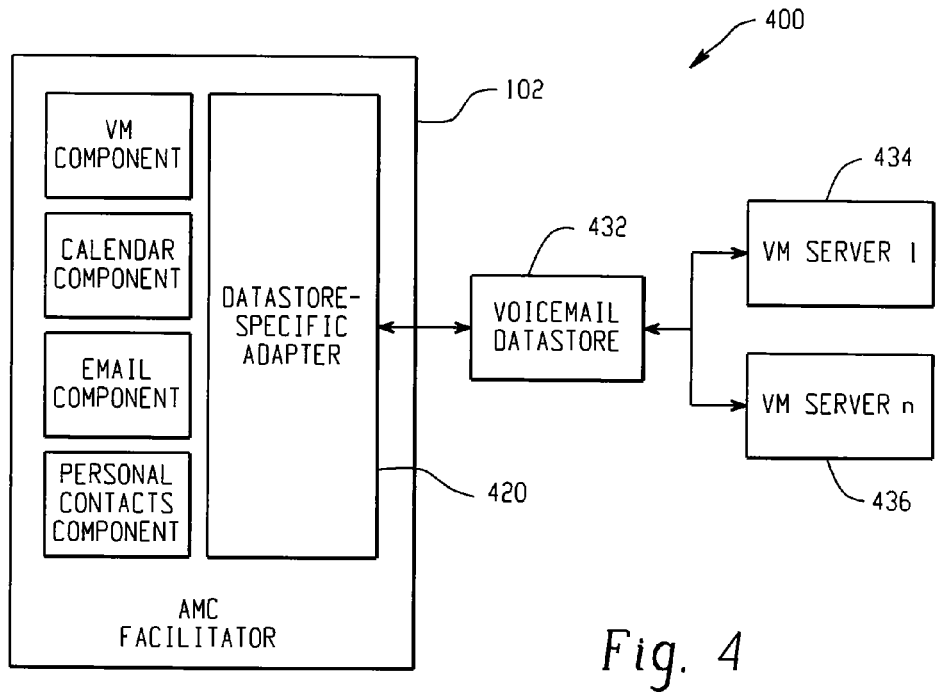
FIG. 4 is a block diagram showing an integrated system that includes the AMC facilitator integrated with an enterprise voicemail or information system, under an embodiment.

FIG. 4 is a block diagram showing an integrated system 400 that includes the AMC facilitator 102 integrated with an enterprise voicemail system 420, under an embodiment. The facilitator 102 of an embodiment interfaces or integrates with components of enterprise voicemail systems using a datastore adapter 420 that is coupled to the voicemail datastore 432 of the enterprise. The enterprise voicemail datastore 432 is coupled to one or more enterprise voicemail servers 434-436 as appropriate to the host enterprise configuration.

The datastore adapter 420 leverages the AMC adapter and component architecture described herein. The datastore adapter 420 is an adapter module or component that is coupled to and/or a component of the facilitator 102 and is configured specifically for a type or configuration of the voicemail datastore 432 of the enterprise. The datastore adapter 420 is coupled to one or more components or modules of the AMC system including but not limited to a voicemail (VM) component, a calendar component, an electronic mail (email) component, and a personal contacts component to name a few. The VM component includes components or code specific to one or more of a type or configuration of the enterprise voicemail systems and is independent of the enterprise voicemail servers 434-436. The VM component interfaces with the enterprise voicemail servers 434-436 using the datastore adapter 420.

Figure 5:
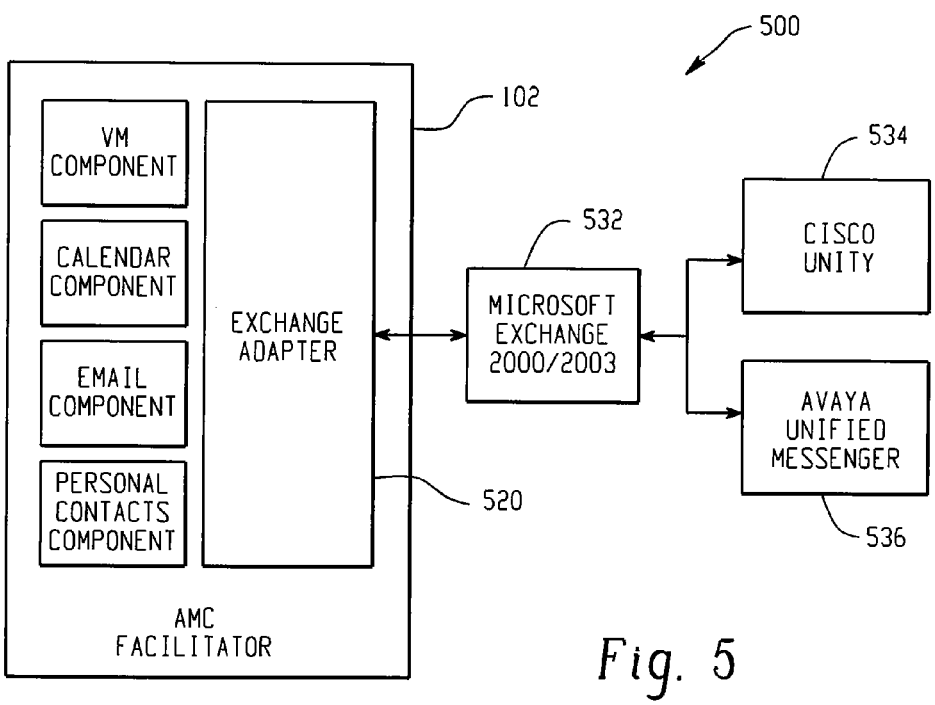
FIG. 5 is a block diagram showing an integrated system that includes the AMC facilitator integrated with an Exchange voicemail database or datastore of the enterprise voicemail system, under an embodiment.

Many enterprise voicemail systems use Microsoft Exchange as a voicemail datastore. FIG. 5 is a block diagram showing an integrated system 500 that includes the AMC facilitator 102 integrated with a Microsoft Exchange ("Exchange") voicemail datastore 532 of the enterprise voicemail system, under an embodiment. The Exchange datastore 532 typically makes the enterprise voicemail available to the AMC facilitator 102 via the Inbox folder and sub-folders of Exchange.

The facilitator 102 of the system 500 interfaces or integrates with enterprise voicemail systems using an Exchange adapter 520 that is coupled to the Exchange application 532 of the enterprise. The enterprise Exchange 532 is coupled to one or more enterprise voicemail servers (e.g., Cisco Unity server 534, Avaya Unified messenger server 536, etc.) as appropriate to the host enterprise configuration. The Exchange adapter 520 leverages the AMC adapter and component architecture described herein. The Exchange adapter 520 is an adapter module or component that is coupled to and/or a component of the AMC facilitator 102 and is configured specifically for the enterprise Exchange 532. The Exchange adapter 520 is coupled to one or more components or modules of the AMC system including but not limited to a voicemail (VM) component, a calendar component, an electronic mail (email) component, and a personal contacts components to name a few. The VM component includes components or code specific to Exchange 532 and is independent of the enterprise voicemail servers 534-536. The VM component interfaces with the enterprise voicemail servers 534-536 using the Exchange adapter 520.

The voicemail of the system 500 is available to the AMC facilitator 102 via the Inbox folder and sub-folders as described above. Any updates to the voicemail message state (e.g., read, unread, erased, etc.) are immediately reflected in the enterprise Exchange 532. Therefore, by synchronizing the AMC system with Exchange 532, both the contents of the voicemail (e.g., sender, time, voice message, etc.) and its state are available to the AMC system. In addition to providing the AMC system all of the information of interest, this configuration allows the AMC system to integrate and function with many voicemail systems, since these server-centric voicemail systems provide integration to Exchange 532. Both Cisco Unity 534 and Avaya Unified Messenger/Modular Messaging 536 support this configuration, to name a few.

Further, some enterprise configurations may not include unified messaging and therefore may use a different server for each of their voicemail and email datastores. Consequently, the AMC system of an embodiment is configured to communicate with at least one enterprise server to fetch voicemails and with at least one enterprise server to fetch contacts and appointments, as described below.

Figure 6:
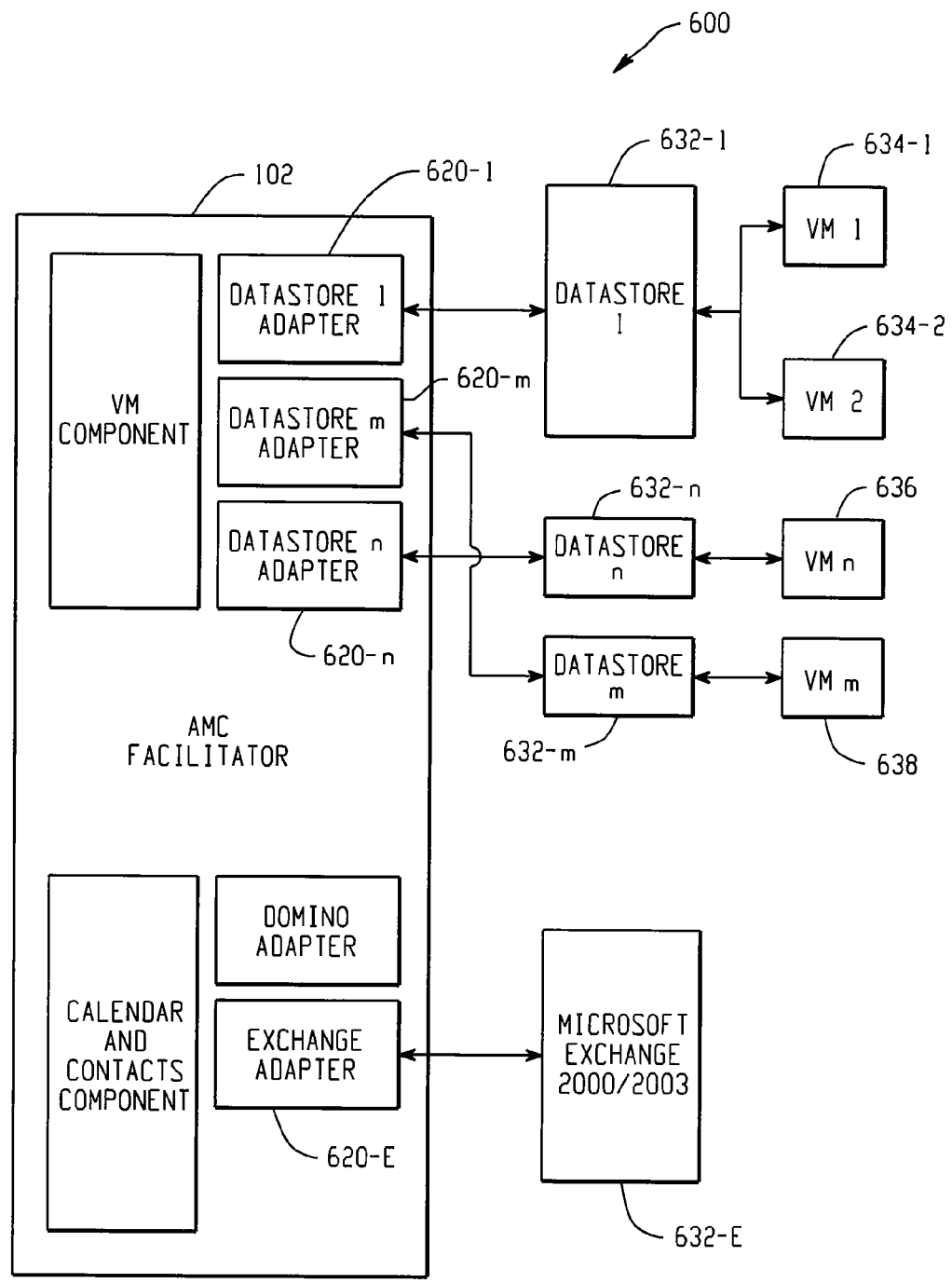
FIG. 6 is a block diagram showing an integrated system that includes the AMC facilitator integrated with multiple enterprise voicemail systems and an Exchange enterprise calendar and contact system, under an embodiment.

Enterprise voicemail systems can include configurations using numerous different voicemail systems and using Exchange as a calendar and contact datastore. FIG. 6 is a block diagram showing an integrated system 600 that includes the AMC facilitator 102 integrated with multiple enterprise voicemail systems 634-638 and an Exchange enterprise calendar and contact system 632-E, under an embodiment.

The facilitator 102 of an embodiment interfaces or integrates with enterprise voicemail systems using a dedicated datastore adapter that is coupled to the voicemail datastore of each voicemail system of the enterprise. At the enterprise, each enterprise voicemail datastore is coupled to an associated voicemail server or system as appropriate to the host enterprise configuration. At the AMC facilitator 102, the VM component of the facilitator is coupled to each of first 620-1, second 620-*m*, and third 620-*n* datastore adapters. The first datastore adapter 620-1 is coupled to first 634-1 and second 634-2 enterprise voicemail servers or systems via a first enterprise voicemail datastore 632-1. The second datastore adapter 620-*m* of the facilitator 102 is coupled to a third enterprise voicemail server or system 636 via a second enterprise voicemail datastore 632-*n*. Similarly, the third datastore adapter 620-*n* of the facilitator 102 is coupled to a fourth enterprise voicemail server or system 638 via a third enterprise voicemail datastore 632-*m*.

Each of the first 620-1, second 620-*m*, and third 620-*n* datastore adapters (collectively 620) of the facilitator 102 leverages the AMC adapter and component architecture described herein. The datastore adapters 620 are adapter modules and/or components that are coupled to a component of the facilitator 102 and are configured specifically for a type or configuration of the respective first, second, and third voicemail datastores (collectively 632) of the enterprise. The VM component includes components or code specific to the four enterprise voicemail systems and is independent of the enterprise voicemail servers 634-638. The VM component interfaces with the four enterprise voicemail servers 634-638 using the three datastore adapters 620-1/620-*m*/620-*n*.

Regarding calendar and contacts information, the facilitator 102 of the system 600 interfaces or integrates with enterprise contact and calendar systems using an Exchange adapter 620-E that is coupled to the Exchange application 632-E of the enterprise, but is not so limited. The enterprise Exchange 632-E is coupled to one or more enterprise components as appropriate to the host enterprise configuration. The Exchange adapter 620-E leverages the AMC adapter and component architecture described herein. The Exchange adapter 620-E is an adapter module or component that is coupled to and/or a component of the AMC facilitator 102 and is configured specifically for the enterprise Exchange 632-E. The Exchange adapter 620-E is coupled to a calendar and contacts component of the facilitator 102. The calendar and contacts component includes components or code specific to Exchange 632-E and is independent of the enterprise calendar and contacts servers. The calendar and contacts component interfaces with the enterprise calendar and contacts servers using the Exchange adapter 620-E.

Some enterprise configurations use a different server type for each of their voicemail and email datastores, and the AMC system of an embodiment is configurable to communicate with at least one enterprise server to fetch voicemails and with at least one enterprise server to fetch contacts and appointments, as described above. Further, some voicemail systems (e.g., Octel) use an embedded datastore in the voicemail system instead, and the AMC system includes a configuration having a proprietary adapter that is voicemail server-specific (e.g., Octel server-specific). Additionally, some voicemail systems (e.g., Avaya) do not integrate to Exchange or Domino but instead use a proprietary datastore and an Internet Message Access Protocol (IMAP) version 4 (IMAP4) interface, and the AMC system includes a configuration that supports IMAP directly from the facilitator. These alternative configurations are described below.

Figure 7:
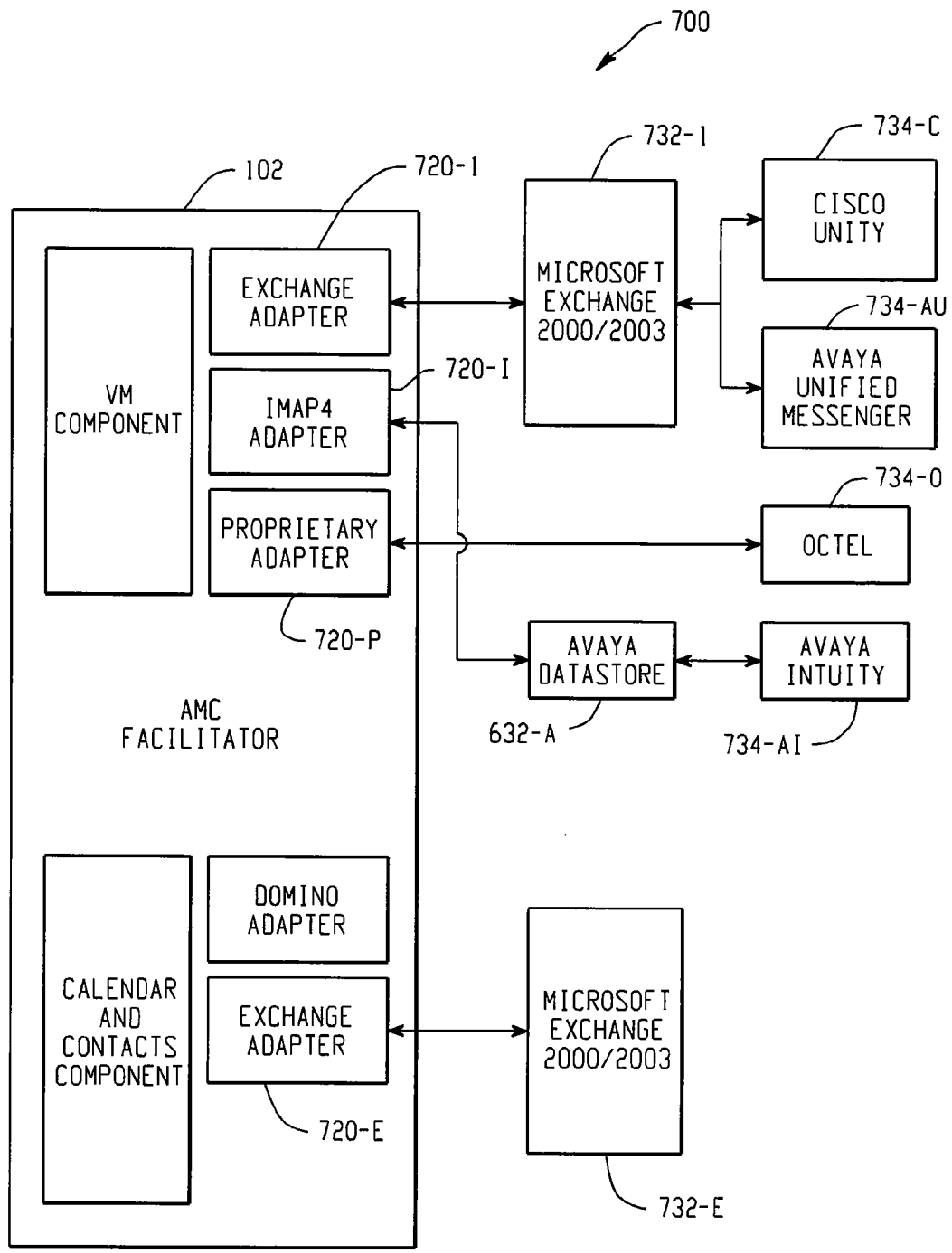
FIG. 7 is a block diagram showing an integrated system that includes the AMC facilitator integrated with multiple enterprise voicemail systems and an Exchange enterprise calendar and contact system, under another alternative embodiment.

FIG. 7 is a block diagram showing an integrated system 700 that includes the AMC facilitator 102 integrated with multiple enterprise voicemail systems and an Exchange enterprise calendar and contact system, under another alternative embodiment. The facilitator 102 of system 700 generally interfaces or integrates with enterprise voicemail systems using a dedicated datastore adapter that is coupled to one of a voicemail datastore or a voicemail system of the enterprise as appropriate to a system configuration of the enterprise. When a voicemail system uses a voicemail datastore, the voicemail datastore is coupled to an associated enterprise voicemail server or system.

The enterprise of integrated system 700 includes numerous different voicemail systems, including Cisco Unity, Avaya Unified Messenger, Octel, and Avaya Intuity systems. Each of the Cisco Unity and Avaya Unified Messenger systems use an Exchange datastore 732-1, and the facilitator 102 interfaces or integrates with enterprise voicemail systems using an Exchange adapter 720-1 that is coupled to the Exchange 732-1 of the enterprise. The enterprise Exchange 732-1 is coupled to each of the Cisco Unity 734-C and Avaya Unified 734-AU messenger servers. The Exchange adapter 720-1 leverages the AMC adapter and component architecture described herein. The Exchange adapter 720-1 is an adapter module or component that is coupled to and/or a component of the AMC facilitator 102 and is configured specifically for the enterprise Exchange 732-1. The VM component includes components or code specific to Exchange 732-1 and is independent of the enterprise voicemail servers 734-C/734-AU. The VM component interfaces with the enterprise voicemail servers 734-C/734-AU using the Exchange adapter 720-1.

The voicemail of the enterprise is available to the AMC facilitator 102 via the Inbox folder and sub-folders as described above. Any updates to the voicemail message state (e.g., read, unread, erased, etc.) are immediately reflected in the enterprise Exchange 732-1. Therefore, by synchronizing the AMC system with Exchange 732-1, both the contents of the voicemail (e.g., sender, time, voice message, etc.) and its state are available to the AMC system. In addition to providing the AMC system all of the information of interest, this configuration allows the AMC system to integrate and function with the Cisco Unity 734-C and Avaya Unified Messenger/Modular Messaging 734-AU systems.

The Avaya Intuity voicemail system uses a proprietary datastore and an IMAP4 interface. The facilitator 102 interfaces or integrates with the Avaya Intuity enterprise voicemail system using an IMAP4 adapter 720-I that supports IMAP directly from the facilitator 102. The IMAP4 adapter 720-I is coupled to the VM component of the facilitator 102 and is coupled to the Avaya datastore 732-A of the enterprise. The Avaya datastore 732-A is coupled to the Avaya Intuity voicemail server 734-AI as appropriate to the host enterprise configuration.

The Octel voicemail system uses an embedded datastore. The facilitator 102 interfaces or integrates with the Octel voicemail system using an proprietary adapter 720-P that supports the Octel system directly from the facilitator 102. The proprietary adapter 720-P is coupled to the VM component of the facilitator 102 and is coupled to the Octel voicemail server 734-0 of the host enterprise. Similar interfaces can be provided under the disclosure herein for voicemail systems and server other than those described above.

Regarding calendar and contacts information, the facilitator 102 of the system 700 interfaces or integrates with enterprise contact and calendar systems using an Exchange adapter 720-E that is coupled to the Exchange 732-E of the enterprise. The enterprise Exchange 732-E is coupled to one or more enterprise components as appropriate to the host enterprise configuration. The Exchange adapter 720-E leverages the AMC adapter and component architecture described herein. The Exchange adapter 720-E is an adapter module or component that is coupled to and/or a component of the AMC facilitator 102 and is configured specifically for the enterprise Exchange 732-E. The Exchange adapter 720-E is coupled to a calendar and contacts component of the facilitator 102. The calendar and contacts component includes components or code specific to Exchange 732 -E and is independent of the enterprise calendar and contacts servers. The calendar and contacts component interfaces with the enterprise calendar and contacts servers using the Exchange adapter 720-E.

The facilitator of the integrated systems 400-700 described above generally uses a protocol specific to the datastore to read, update, or delete voicemails. If the datastore is Exchange, then the facilitator can use either WebDAV, MAPI, or IMAP for example. The facilitator can either periodically poll the appropriate folder or subfolders in Exchange using one of these protocols or it may configure Exchange to send it a signal, using WebDAV or IMAP, when a voicemail arrives, or one is deleted, or when a voicemail's state changes; once the facilitator receives the signal from Exchange, the facilitator retrieves the new information.

If the datastore is not Exchange but does supports IMAP, then the interaction is the same as above, but using IMAP only instead of WebDAV and/or MAPI.

If the datastore uses a proprietary protocol, then the facilitator periodically polls the appropriate data structure hierarchy using this protocol. If a push mechanism is supported, the datastore sends a signal to the facilitator, using WebDAV or IMAP, when a voicemail arrives, or one is deleted, or when a voicemail's state changes; once the facilitator receives this signal, the facilitator retrieves the new information.

As described above, the AMC system provides notifications to a client device of a voicemail message received at the enterprise. In providing notifications of the voicemail, the AMC system of an embodiment provides synchronization (e.g. one-way and/or two-way) between the enterprise voicemail server and the AMC facilitator. In so doing, the AMC facilitator periodically fetches voicemail information from the enterprise voicemail server. In addition to fetching voicemail information, the facilitator of an embodiment can receive notifications when there is a change in state in the enterprise voicemail server. Using the received voicemail information, the AMC system provides voicemail notifications to a user that has received voicemails by either starting a new conversation thread in the AMC client when a caller sends a voicemail to the user, or, inserting the voicemail into a previous conversation if the caller has sent previous voicemails or other messages or calls. The voicemail may automatically expire after a configurable time (e.g., 24 hours) but is not so limited.

The starting of a new conversation thread, or insertion into an existing one, includes transmission by the facilitator of a Orative Markup Language (OML) voicemail message to the device, over the OLWP protocol, as described in the Related Applications, but is not so limited. The message includes information of the voicemail message received in the enterprise voicemail system but is not so limited. The underlying mechanism used by OLWP for signaling a client of new information includes the use of a persistent TCP connection or a standard push message including, but not limited to, an SMS message, email message, MMS, or any other push message type accepted by a particular target device; the client then uses OLWP and OML to fetch the new voicemail information from the facilitator.

Before transmitting to the client, using information of the received voicemail, the facilitator maps the voicemail originator's (caller) automatic number identification (ANI) or email to either an AMC user handle or to a name in the user's contact directories. The mapping uses contact information of one or more of a variety of available sources, including the corporate directories, the user's personal contacts, and potential CRM databases.

If the caller ANI or email address match that of an AMC user, the facilitator determines the caller is an AMC user and sends one or more of the originator's AMC address, active AMC mobile telephone number, and official first and last names to the client in a voicemail message. If the originator is not an AMC user, but the email address or caller ID matches a contact in the user's corporate phonebook (e.g., the full Active Directory), the originator's name, email address, and one or more telephone fields is retrieved and sent as part of a voicemail message to the client. The specific telephone fields retrieved are configurable; the default setting is the corporate desk telephone. If the originator is not an AMC user, but the caller ID matches a contact in the user's personal contact directory (not just the active telephone book), the originator's name, email address, and additional phone numbers are retrieved and sent as part of the voicemail message to the client. If the caller ID is unknown because the information does not match any contact information related to the user in the AMC system, an "unknown caller" message is sent from the facilitator to the client along with the number (if known). The importance of the voicemail is also sent by the facilitator to the client.

The AMC system supports several types of user and response options upon receiving at the client device notification of an enterprise voicemail, and the response options of an embodiment depend on the type of caller and the desires of the user recipient of the message. These options include an enterprise voicemail box dial-in option, a voicemail playback option, and reply options by which the user generally can reply to a voicemail using an active call request, text message, or call options as described below. The options also include voicemail message delete options.

For example, if the originator leaving the voicemail is an AMC user, the client can respond with a call request or text message, and the facilitator includes the originator's AMC address in the call request. If the telephone number is known for the originator of the voicemail, the client can initiate a call to the caller by dialing the caller's telephone number. If the telephone number is known but the originator is not an AMC subscriber, the client can respond with a call request or text message via a communication path to non-subscribers as described in the Related Applications.

The AMC system supports a voicemail playback option under which the AMC client dials into the enterprise voicemail system and leverages the existing voice mail server to navigate among the user's voicemails. The user enters his/her enterprise voicemail ID and password, and is then enabled through the use of DTMF signaling (e.g., using client device key entries) to perform actions including navigating to a selected message, playing the message, pausing the message, rewinding the message to name a few. The voicemail telephone number is set on the user portal as a preference.

The AMC system of an embodiment provides several options for play back of voicemail messages. A first playback option, for example, includes the AMC client commanding the facilitator to couple or link a telephone number (e.g., enterprise telephone number) to the voicemail message, and the client dials into the telephone number to play the message. A second playback option includes the AMC client commanding the facilitator to subsequently dial back the AMC client and play the voicemail message. The first and second playback options include the use of a direct integration to a private branch exchange (PBX), a third-party VoiceXML (VXML) server, and/or other communication system.

A third playback option includes the facilitator transmitting the voicemail message directly to the AMC client; the client stores the received message and plays it as described herein. The third playback option includes downloading via streaming, bulk downloading of voicemail messages, and/or downloading byte ranges of voicemail data; other transmission alternatives can be used as known in the art. Downloading of voicemails to the client can occur automatically and/or in response to a request or other user action. In one embodiment, the client may download a certain category of voicemails automatically (e.g., from certain people or high priority ones) before presenting the voicemail to the user, therefore eliminating or at least substantially reducing network latency before the user can play the message. In other cases, the client may only download each voicemail only after the user explicitly asks to play the voicemail.

Furthermore, voicemails can be downloaded under a variety of circumstances including but not limited to downloading prior to the client sending notification of the voicemail to a user, downloading simultaneous with sending notification of the voicemail to a user, and/or downloading after sending notification of the voicemail to the user. One or more voicemails can be downloaded to the client in a download session, and one or multiple voicemails can be stored simultaneously on the device. The various alternatives for downloading and/or storing voicemail messages can be configurable or reconfigurable by a user of the client device and/or automatically configurable or re-configurable by the facilitator in response to one or more parameters (e.g., data tariff charges, importance of a voicemail, voicemail sender, etc.). The third playback option may be preferred from the user experience perspective, as it operates independently of PBX vendors, and provides a long-term path that enables the addition of more features (e.g., voice subjects) and optimizes the user experience.

For playing back a specific voicemail message under the third playback option, the client and facilitator, in an embodiment, supports a synchronous request-response file download mechanism. Under the file download mechanism, the facilitator embeds the reference ID and byte length of a binary file in a voicemail-type call request in the original OML message, where the binary file includes the voicemail contents. The AMC client then requests the binary file via HTTP over OLWP to the facilitator; the client may optionally specify a byte offset and length of the binary file. The facilitator responds to the client file request with a HTTP over OLWP response comprising the requested byte range for the file. HTTP over OLWP is identical to standard HTTP over TCP, except over a multiplexing OLWP protocol, which in turn is over TCP; the benefit of OLWP is that it allows the client to maintain a single TCP connection to the facilitator, over which it transmits both OML and HTTP data.

If the connection between the client and the facilitator is interrupted during downloading of the file, the client re-requests the appropriate file or byte range within the file. In an embodiment, the client repeats the process described above to download the file, but is not so limited.

Upon completing download of the binary file with the voicemail message content, the AMC client stores the voicemail message in the client device. This allows a user to access the voicemail message and perform actions like playing, pausing, rewinding, and re-playing the message without any added network latency. In one embodiment, the binary file that includes the message is over-written when a new binary file including a new voicemail message is downloaded to the client. To re-access a voicemail message that has been over-written, the client can request and fetch the corresponding binary file again from the facilitator. In another embodiment, multiple binary files are stored or cached on the client, so all of these voicemails can be played without added network latency; standard caching algorithms (e.g., least recently used) are used to prioritize which files are overwritten first when memory constraints arise.

The AMC system of an embodiment is configured to convert the voicemail message among any number of formats including Waveform audio format (WAV), Code Excited Linear Prediction (CELP), Adaptive Multi-Rate (AMR), and Audio Interchange File Format (AIFF) to name a few; alternative embodiments may support other audio formats. The facilitator of an embodiment converts the content type of the voicemail message to an audio format more appropriate for the client device and/or a communication network by which the client device communicates before or simultaneous with file transmission to the client. The determination as to whether to convert an audio format is made according to one or more parameters of the client device and/or the communication network. For example, the decision on transcoding of the audio format is made using information of one or more of audio file size, client device capabilities, communication network bandwidth, communication network capabilities, and communication network data tariff charges.

The AMC system of an embodiment is configured to allow a user to delete a voicemail message in the enterprise voicemail system by deleting the message on the client device. In deleting a message, the AMC client locally deletes the voicemail notification. Embodiments of the AMC system provide two-way synchronization so that a delete action taken by a user on the AMC client automatically results in the facilitator deleting the voicemail at the appropriate voicemail server in the enterprise voicemail system. In an alternative embodiment a delete action taken by a user on the client device may not be synchronized with the facilitator, and thus may not be synchronized with the enterprise voicemail system. If the voicemail server deletes a voicemail (e.g., because the user deleted it using his desk telephone), the facilitator receives an event from the enterprise voicemail system, and deletes the voicemail from the client in response to the event.

The AMC system also provides a status of voicemail messages of the enterprise voicemail system. Generally, the AMC client is configured to change the status of an enterprise voicemail message to "read" or "unread" from the client device. A status change made to an enterprise voicemail message at the client is propagated or communicated to the facilitator which then changes the voicemail status at the enterprise voicemail server to be consistent with the status in the AMC client.

For example, when a user listens (even partially) to an enterprise voicemail from the client device, the status of the enterprise voicemail is automatically changed at the client to a "read" status; the facilitator then communicates the status change to the enterprise voicemail server where it is also changed to a "read" status.

The integrated voicemail described herein provides "visual voicemail" that overcomes the shortcomings associated with a user having to dial into a voicemail system and navigate through a menu of options using conventional voice and/or DTMF-based browsing. The visual voicemail instead provides a visual presentation on a client device of the user's voicemails along with state information of the voicemails. The visual presentation of the voicemails includes a user interface that allows a user to control or manipulate voicemails from the client device, where the manipulation includes playing, pausing, rewinding, fast-forwarding, deleting, and changing a state of each voicemail.

Figure 8A:
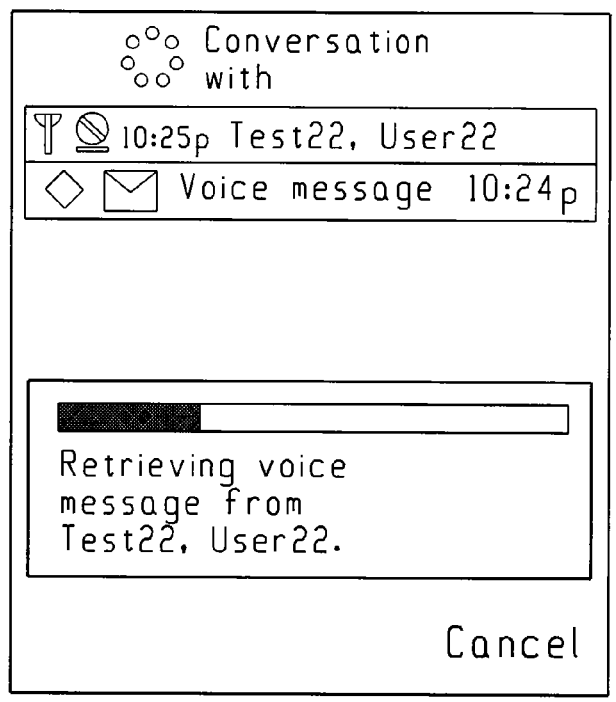
Figure 8B:
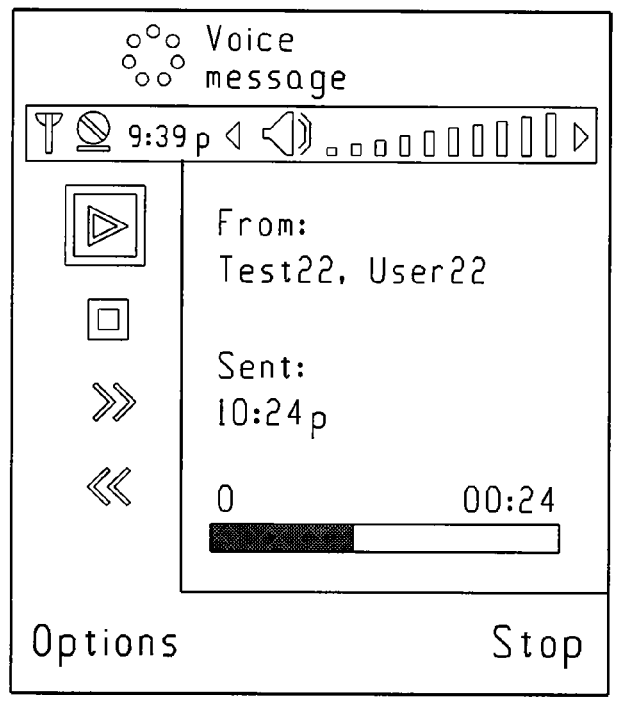

FIGS. 8A, 8B, and 8C show aspects of the visual voicemail presentation on a client device, under an embodiment. FIG. 8A shows an example download screen of the client device during downloading of a voicemail to the client device, under an embodiment. FIG. 8B shows an example playback screen of the client device during playback of a voicemail at the client device, under an embodiment. The playback screen displays information including, for example, the voicemail originator's name, a time the voicemail was sent, a length of the voicemail, and the progress of the playback. FIG. 8C shows controls displayed on the client device and the corresponding functions for use in manipulating a downloaded voicemail message at the client device, under an embodiment.

FIG. 9 is a flow diagram of integrated communications between mobile communication devices and enterprise voicemail systems, under an embodiment. Information of a voicemail message is received 902 from a voicemail system. The voicemail system is a server-based system of an enterprise. The voicemail message is received at the voicemail system via conventional methods. A state of the voicemail message is automatically synchronized 904 between a mobile communication device and an access component of the voicemail system in response to changes in the voicemail message. The changes in the voicemail message are made via one or more of the mobile communication device and the access component.

The AMC system as described above allows a user of the client device (referred to as the "originator" of the Active Call Request in the following description) to use an Active Call Request to politely ask the originator of a voicemail message (referred to as the "recipient" of the call request in the following description) if the recipient is ready to take a phone call in response to his/her voicemail message. The Active Call Request, which is described in detail in the Related Applications, also provides discreet response options by which the recipient can provide timely feedback to the originator. Callers thus have the satisfaction of knowing the receiver acknowledged their call request and will make time to talk.

The AMC system, upon initiation of an Active Call Request, provides the originator various options to tailor the request to his/her unique situation and to provide more context to the intended recipient(s). Active Call Requests support numerous input options including priority, text subject, voice subject, originator's phone number, and expiration time to name a few. The text subject input option allows end-user keying of a text subject tag. An embodiment supports selection of pre-defined text subjects, and the portal supports definition of the pre-defined text subjects.

The voice subject or voice instant message (VIM) input option supports the user recording an audio voice subject of a pre-specified duration via a handset interface. The voice subjects are stored on the handset to facilitate offline usage, but are not so limited. The voice subject of an embodiment is kept on the originating handset until successful delivery of the voice subject to the facilitator. The facilitator may convert the audio format between the originating handset and the recipient handset, based on individual handset audio format playback capabilities.

The originator's phone number input option supports end-user keying of phone numbers and embedding of these phone numbers in the request alert. The default number is the originator's mobile phone number.

The expiration time input option allows the end-user to input an expiration time value at the handset to specify a time period after which the call request automatically expires. A maximum expiration period is no more than 72 hours in the future, and a default expiration time is 180 minutes, but the embodiment is not so limited.

Figure 10:
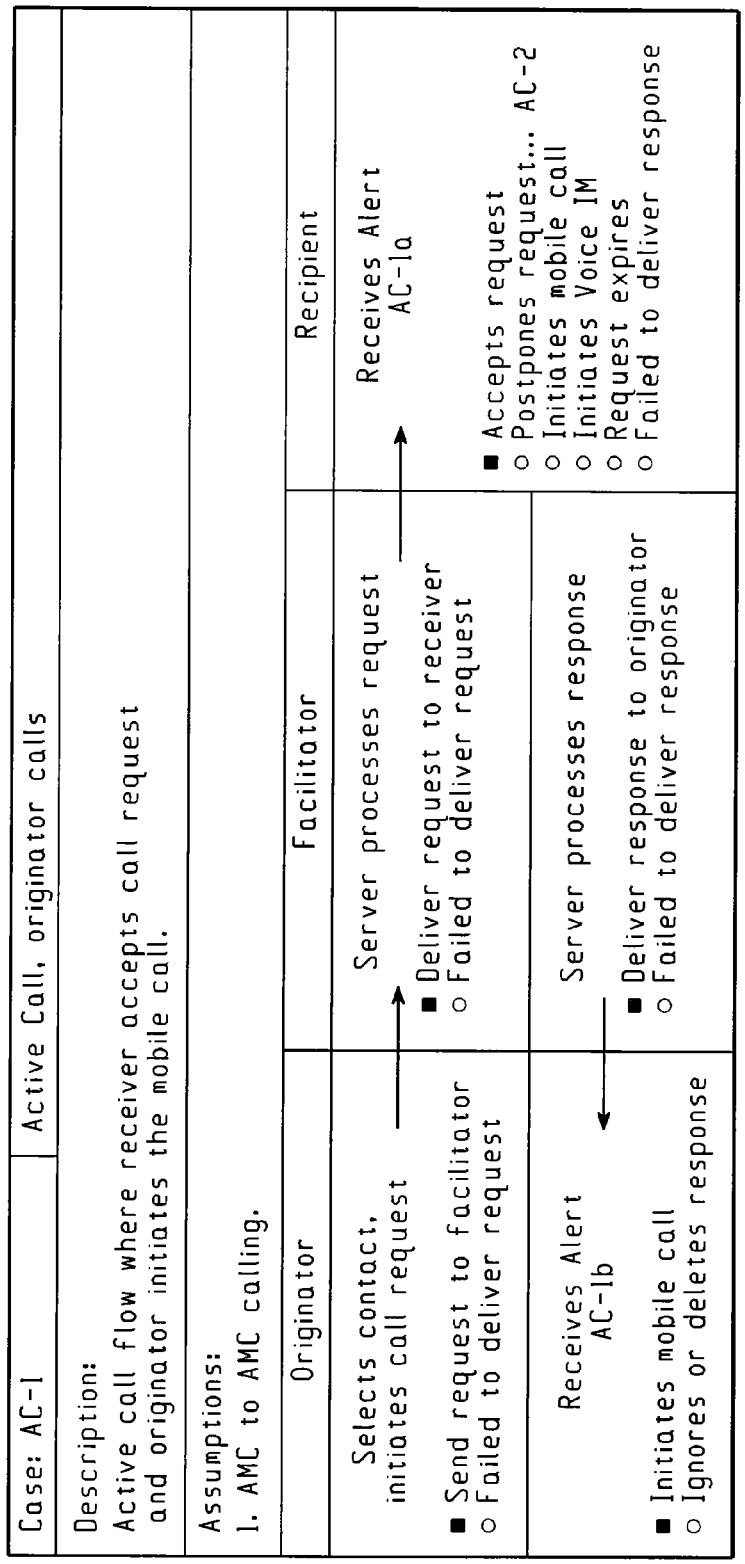
FIG. 10 is a flow diagram for an Active Call (AC), under an embodiment.

FIG. 10 is a flow diagram for an Active Call (AC), under an embodiment. An Active Call begins when an originator selects a contact and initiates an Active Call request to the contact using the originator's handset. The facilitator processes the call request and in response forwards an alert message to a handset of the selected contact, where the alert message is referred to herein as a Notification of Active Call Request alert message (AC-1a).

The flow diagrams provided herein include logic flows that start in the upper left-most cell and proceed to the right, then down, and back to the left, row-by-row (see arrows) until the lower left cell is reached. Arrows are used in the call flow to direct the flow for the reader. Generally, caller/originator behavior is always on the left, AMC facilitator behavior in the middle, and call recipient behavior on the right. Within the call flow the action taken by a party (originator and/or recipient) is shown followed by the possible responses (bulleted). The normal response course is designated with a solid bullet, and alternative courses are designated with hollow bullets.

FIG. 11 is a template of the Notification of Active Call Request alert message (AC-1a), under an embodiment. This alert message is sent to the recipients of an Active Call Request to inform the intended recipient that a caller wishes to speak with him, and provides convenient options for responding to the request. The Notification of Active Call Request alert message supports a number of response options by the recipient including accepting the request with the recipient's handset phone number, accepting the request with a phone number input by the recipient, initiating the mobile call to the originator using the value in the originator's phone number field of the alert message, responding with a pre-defined text message, initiating a voice instant message to the originator, deleting the request, and requesting a postponement of the call. Actions by the recipient including accepting the call request, initiating the mobile phone call, responding with a pre-defined text message, and initiating a voice instant message to the originator result in automatic deletion of the alert message from the recipient's inbox, but the embodiment is not so limited. Further, information of delivery confirmation states of the Notification of Active Call Request alert message is provided to the originator.

The facilitator processes any response by the receiver and in response forwards an alert message to the originator, where the alert message is referred to herein as a Notification of Active Call Request Acceptance alert message (AC-1b). FIG. 12 is a template of the Notification of Active Call Request Acceptance alert message (AC-1b), under an embodiment. This alert message notifies the originator that the intended recipient of the Active Call Request has accepted the request and that the recipient is ready to participate in the call. Further, the Notification of Active Call Request Acceptance alert message provides the originator with response options that include a one-button mechanism for initiating a mobile call to the recipient, and an option to delete the alert message. Additionally, information of delivery confirmation states of the Notification of Active Call Request Acceptance alert message is provided by the facilitator to the receiver.

The AMC system described herein also supports Active Call Requests by an originator/subscriber receiving a voicemail message from a recipient/non-subscriber. The AMC system upon initiation of an Active Call Request by an originator (subscriber) to a recipient (non-subscriber) provides the originator various options to tailor the request to his/her unique situation and to provide more context to the recipient (non-subscriber). Active Call Requests to non-subscribers support numerous input options including priority, text subject, originator's phone number, and expiration time to name a few.

The text subject input option allows the originator (subscriber) to key a text subject tag. An embodiment supports selection of pre-defined text subjects, and the portal supports definition of the pre-defined text subjects.

The originator's (subscriber) phone number input option supports originator (subscriber) keying of phone numbers and embedding of these phone numbers in the request alert. The default number is the originator's (subscriber) mobile phone number. The expiration time input option allows the originator (subscriber) to input an expiration time value at the handset to specify a time period after which the Active Call Request automatically expires.

Once generated, the active call request to the recipient (non-subscriber) is transferred to the originator's (subscriber) handset by the AMC system. The AMC system repackages contents of the Active Call Request into an SMS message directed at the mobile phone number of the recipient (non-subscriber). As one example, the SMS message is as follows: "<Originator name> at <phone number> is requesting to speak with you before <local expiration time>. <Priority>".

Delivery confirmation states of the call request SMS message are provided to the originator (subscriber), and these states include at least one of "Not Sent", "In Transit", "Delivered", and "Delivery Failed". FIG. 13 is a template of the Active Call Request to a Non-Subscriber (ON-1a), under an embodiment.

Figure 14:
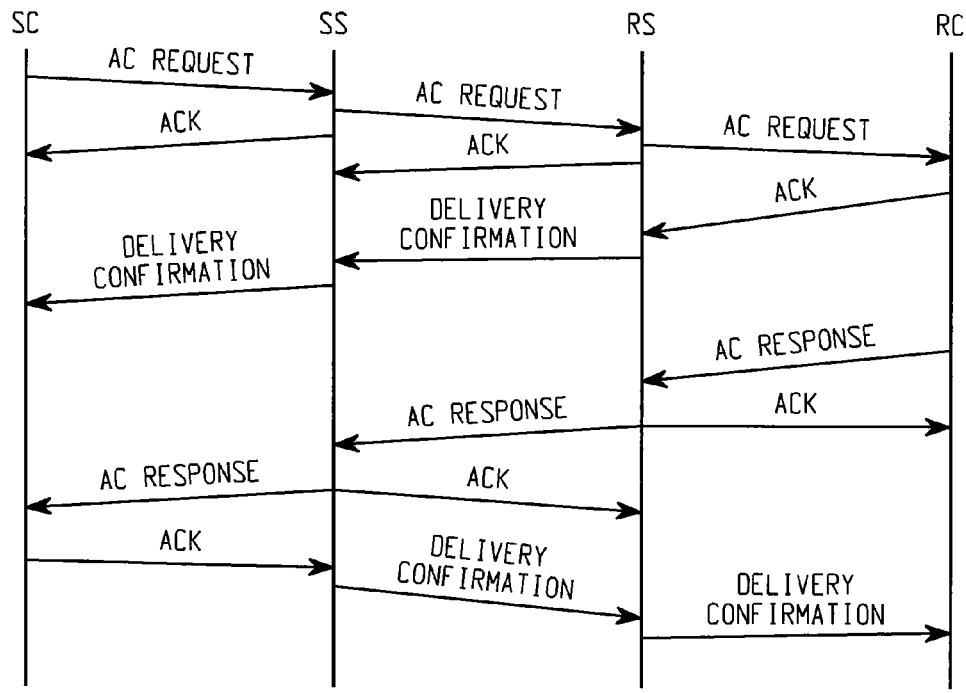
FIG. 14 is a message flow diagram for an active call flow, under an embodiment.

Considering the AMC system protocol, the Active Call flow described above with reference to FIG. 10 is revisited. FIG. 14 is a message flow diagram for an active call flow, under an embodiment. The active call flow includes three types of messages: Active Call Request (ACRequest); Active Call Response (ACResponse); and Delivery Confirmation (DeliveryConfirmation). An active call is initiated with an ACRequest; logically, it is sent by the Sender Client (SC) to the Recipient Client (RC); the SC and RC are both AMC clients hosted on separate handsets. When the RC receives the ACRequest, it sends a Delivery Confirmation back to the SC. The RC also may send an ACResponse, indicating acceptance or postponement of the corresponding ACRequest. When the SC receives the ACResponse, it also sends back a Delivery-Confirmation to the RC.

The SC and the RC of an embodiment do not communicate directly with each other but rather convey information via one or more facilitators hosted on one or more servers, where the servers are referred to as the Sender Server (SS) and the Recipient Server (RS). The SC connects to the SS while the RC connects to the RS. The SS and RS may be in the same domain or different domains.

To optimize client traffic and reduce bandwidth, Delivery Confirmations are not generated by the AMC clients themselves. Instead, the RS sends a Delivery Confirmation message when it receives the ACK from the AMC client.

Delivery Confirmations are automatically generated by the system, enabling the sender to know of the status of the message. Unlike a Delivery Confirmation, an Active Call Response message is only generated after user input, indicating a response to the active call request. The three components of active calls, Active Call Requests, Active Call Response, and Delivery Confirmations are each described in turn below.

Beginning with the Active Call Request, the SC generates a new Active Call Request message (ACRequest) for transmission to the SS. In response to the Active Call Request message, SS sends an acknowledgement message (ACK) to SC. The SS then sends an Active Call Request message (ACRequest) to RS, and RS responds by sending an acknowledgement message (ACK) to SS. The RS also sends an Active Call Request message (ACRequest) to RC. If RC is able to process the request message (ACRequest) from RS, then RC sends an acknowledgement message (ACK) to RS. During this Active Call Request call flow, if any Active Call Request message (ACRequest) remains undelivered and expiry is reached, then SC, SS (optional) and RS (optional) mark the status of the request as "failed to deliver" and each processing endpoint in the chain ceases to forward the request any further.

Continuing with the active call flow following the Active Call Request, the SC Active Call Response is a message generated on the handset by the recipient of the Active Call Request in response to the Active Call Request described above. The sender of an Active Call Request is the recipient of the Active Call Response, and the recipient of the Active Call Request is the sender of Active Call Response.

In response to receipt of the Active Call Request, and with continuing reference to FIG. 14, RC generates an Active Call response message (ACResponse). In response to receipt of the Active Call Request message (ACRequest), RS sends an acknowledgement message (ACK) to RC. In response to receipt of the acknowledgement message (ACK) RS sends an Active Call Response message (ACResponse) to SS. During the Active Call Response described herein if RC chooses to ignore the response message (ACResponse) and does not respond with a response message, then SC, SS, RS, and RC expire the response and set the status as "expired".

In response to receipt of the Active Call Response message (ACResponse) SS sends an acknowledgement message (ACK) to RS. In response to receipt of the acknowledgement message SS sends an Active Call Response message (ACResponse) to SC. During the Active Call Response described herein if RC chooses to ignore the Active Call Response message (ACResponse) and does not respond, then SC, SS, RS, and RC expire the response and set the status as "expired".

In response to receipt of the Active Call Response message (ACResponse) SC sends an acknowledgement message (ACK) to SS. During the Active Call Response if RC chooses to ignore the Active Call Response message (ACResponse) and does not respond, then SC, SS, RS, and RC expire the response and set the status as "expired". Furthermore, if the status of the Active Call Response message (ACResponse) remains "undelivered" and expiry of the Active Call Request message (ACRequest) is reached, then RC, RS, SS and SC mark the Active Call Request message (ACRequest) status as "expired"; if the Active Call Response message (ACResponse) status is "undelivered" and the status of the Active Call Request message (ACRequest) changes to "expired", an endpoint marks the Active Call Response message (ACResponse) as "expired".

Continuing with the active call flow following the Active Call Response, delivery confirmations are sent after both Active Call Requests and Active Call Responses. The sender of an active call request is the recipient of the active call response, and the recipient of the active call request is the sender of active call response.

Figure 15:
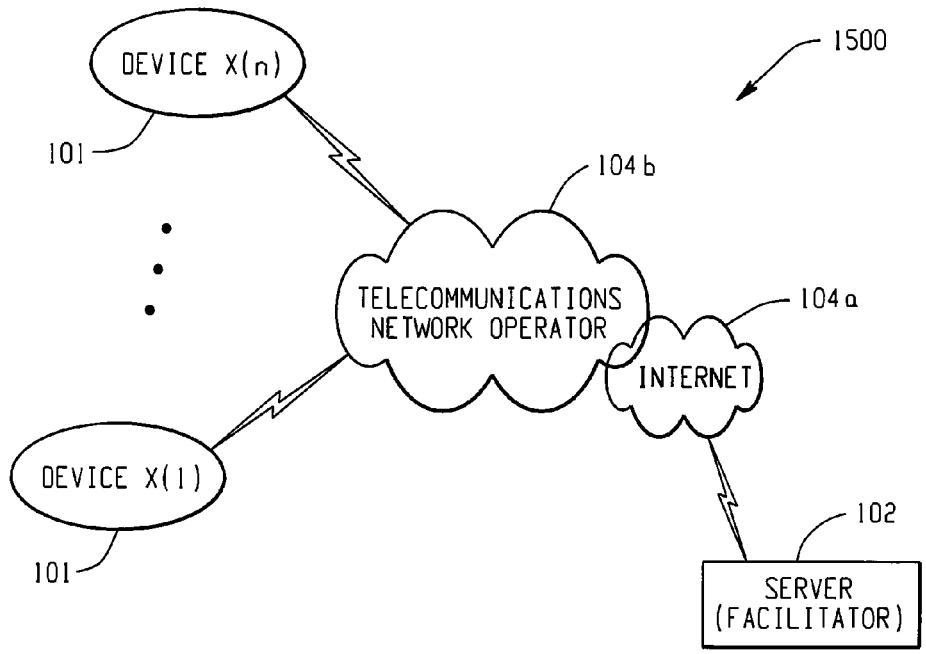
FIG. 15 is a block diagram of an AMC system, under an alternative embodiment.
Figure 16:
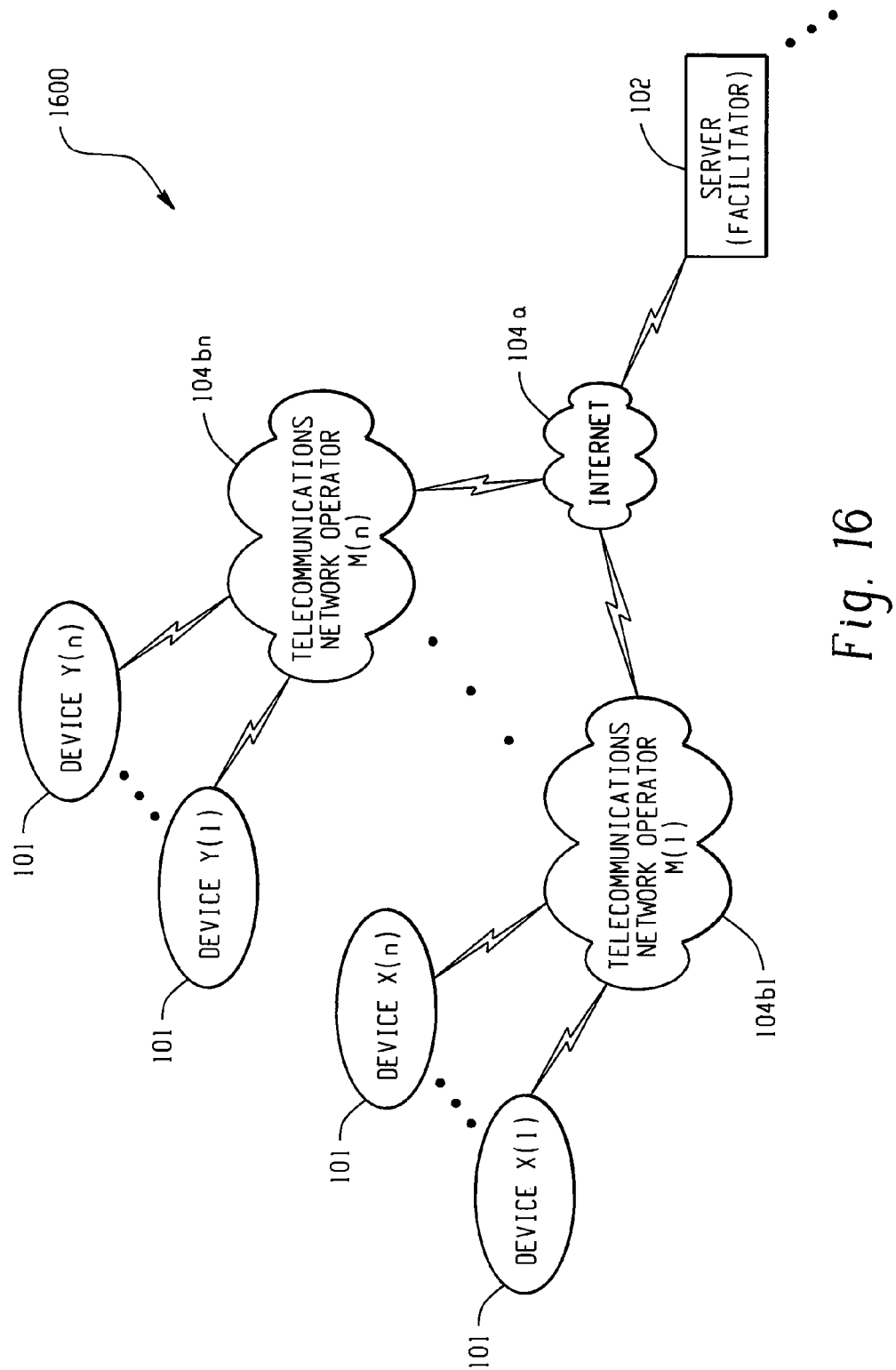
FIG. 16 is a block diagram of an AMC system, under another alternative embodiment.

In response to an Active Call Request, and with continuing reference to FIG. 14, RC sends a Delivery Confirmation message to SC, where RC is connected to RS (Recipient Server) and SC is connected to SS (Sender Server). A similar Delivery Confirmation message in response to the Active Call Response message is also possible. In response to receipt of the Delivery Confirmation message RS sends an acknowledgement message (ACK) to RC. In response to receipt of the acknowledgement message (ACK) RS sends a Delivery Confirmation message to SS. In response to receipt of the Delivery Confirmation message SS sends an acknowledgement message (ACK) to RS. In response to receipt of the acknowledgement message (ACK) SS sends a Delivery Confirmation message to SC. In response to receipt of the delivery confirmation message SC sends an acknowledgement message (ACK) to SS Some examples follow of alternative AMC system configurations that include the facilitator and client described above. FIG. 15 is a block diagram of an AMC system 1500, under an alternative embodiment. The AMC system 1500 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

FIG. 15 is a block diagram of an AMC system 1600, under another alternative embodiment. The AMC system 1600 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above with reference to FIG. 15, but are not so limited.

Figure 17:
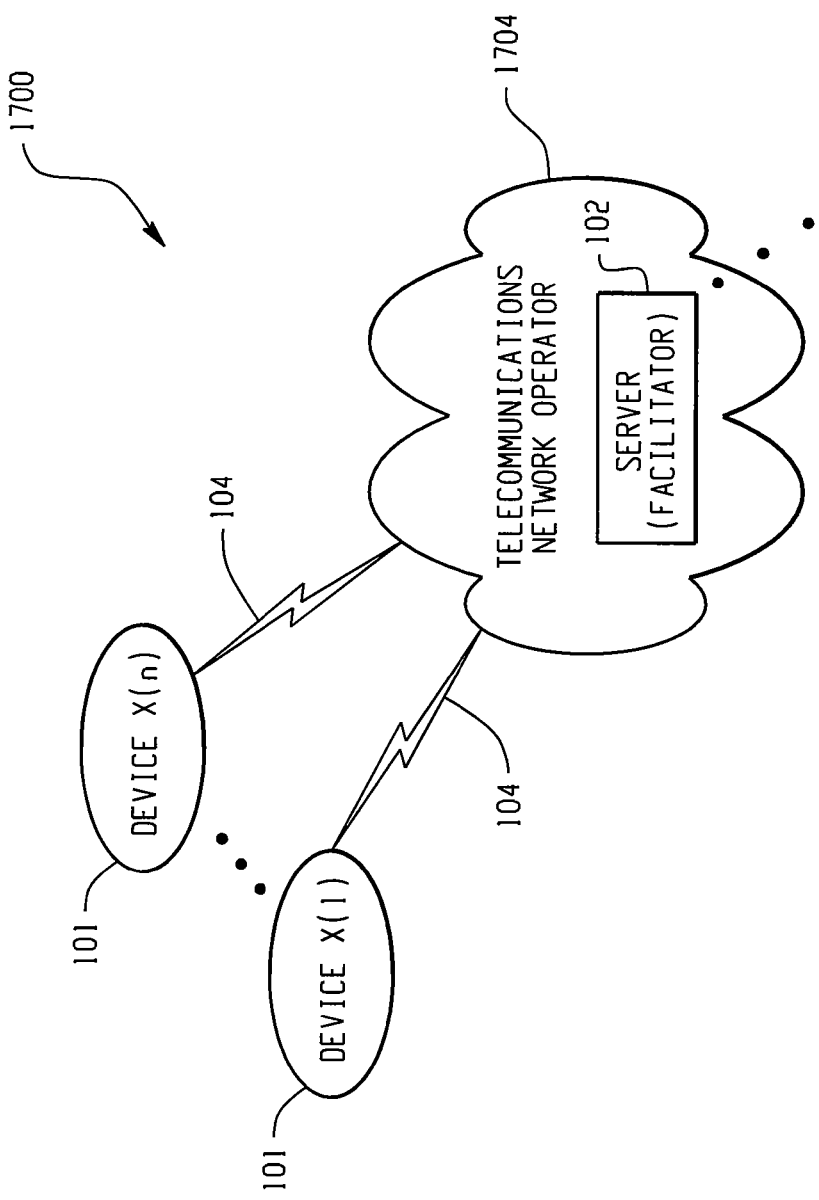
FIG. 17 is a block diagram of an AMC system, under yet another alternative embodiment.

FIG. 17 is a block diagram of an AMC system 1700, under yet another alternative embodiment. The AMC system 1700 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited.

Figure 18:
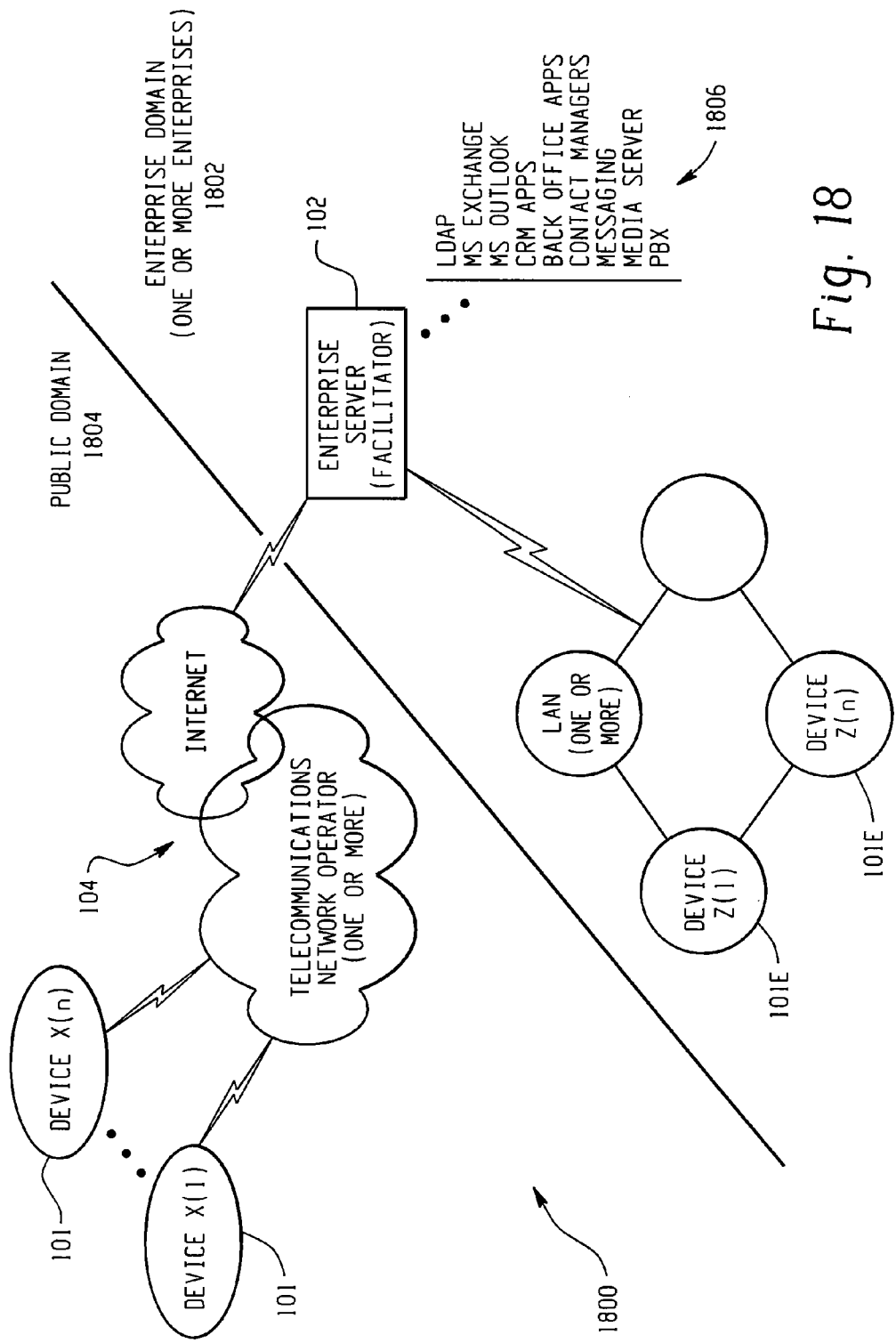
FIG. 18 is a block diagram of an AMC system in an enterprise domain, under another alternative embodiment.

FIG. 18 is a block diagram of an AMC system 1800 in an enterprise domain, under another alternative embodiment. The AMC system 1800 includes a server hosting the facilitator 102 where the server/facilitator 102 is a component of a corporate or enterprise infrastructure 1802. The server can host numerous additional applications 1806 in addition to the facilitator 102 or can be dedicated to the facilitator 102. The facilitator 102 communicates with one or more client devices 101 in the public domain 1804 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 1802 to provide AMC system functions among the client devices 101E as described below. The client devices 101E in the enterprise domain 1802 are shown coupled to one or more LANs, but are not so limited.

Figure 19:
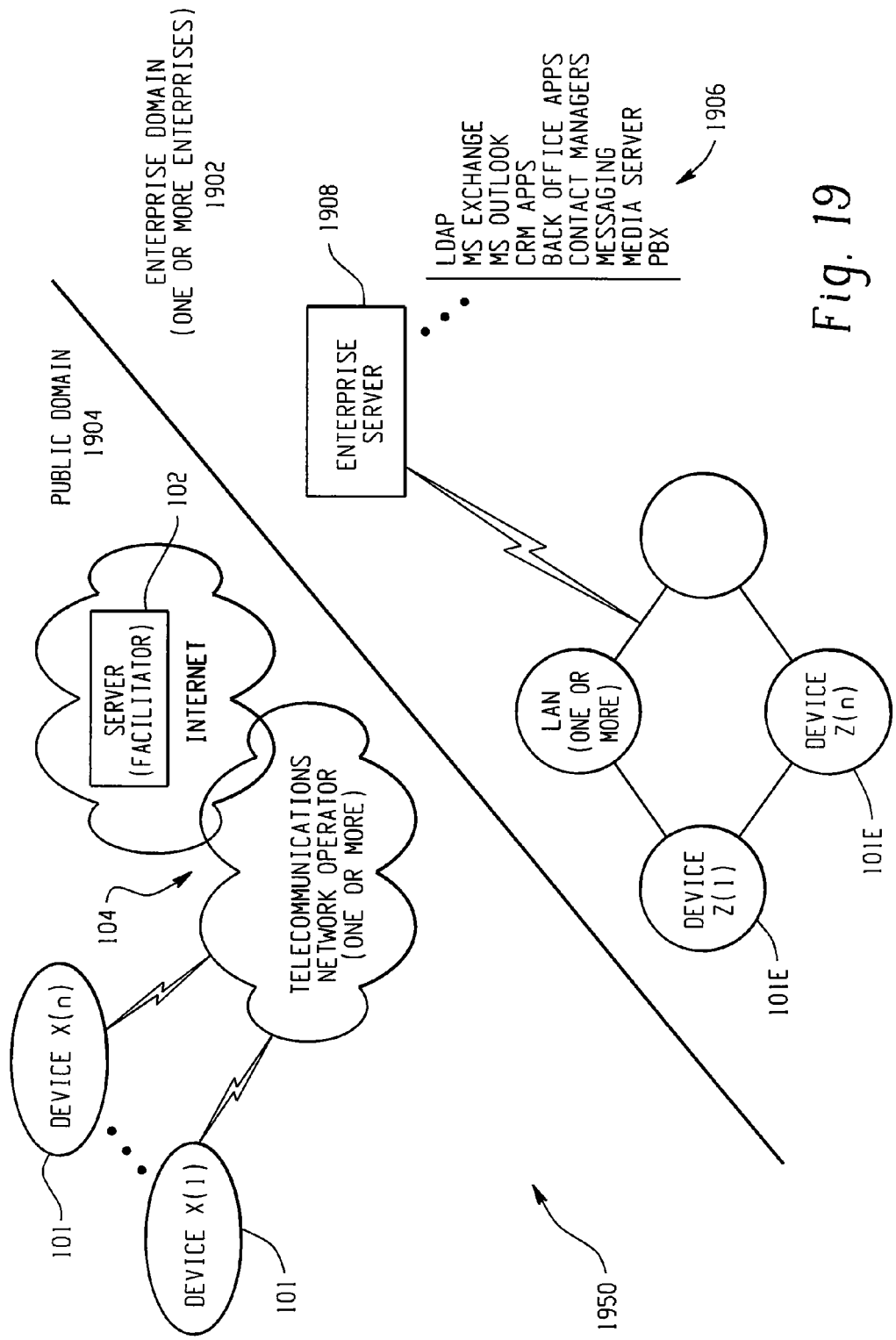
FIG. 19 is a block diagram of an AMC system in a public domain coupled across components of an enterprise domain, under another alternative embodiment.

FIG. 19 is a block diagram of an AMC system 1950 in a public domain coupled across components of an enterprise domain, under another alternative embodiment. The AMC system 1950 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1904 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1902 including, for example, one or more client devices 101E, one or more enterprise servers 1908, and one or more LANs. The facilitator 102 provides AMC system functions among the client devices 101E as described below. The client devices 101E in the enterprise domain 1902 are shown coupled to one or more LANs, but are not so limited.

As an alternative to the couplings of this AMC system 1900, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 20:
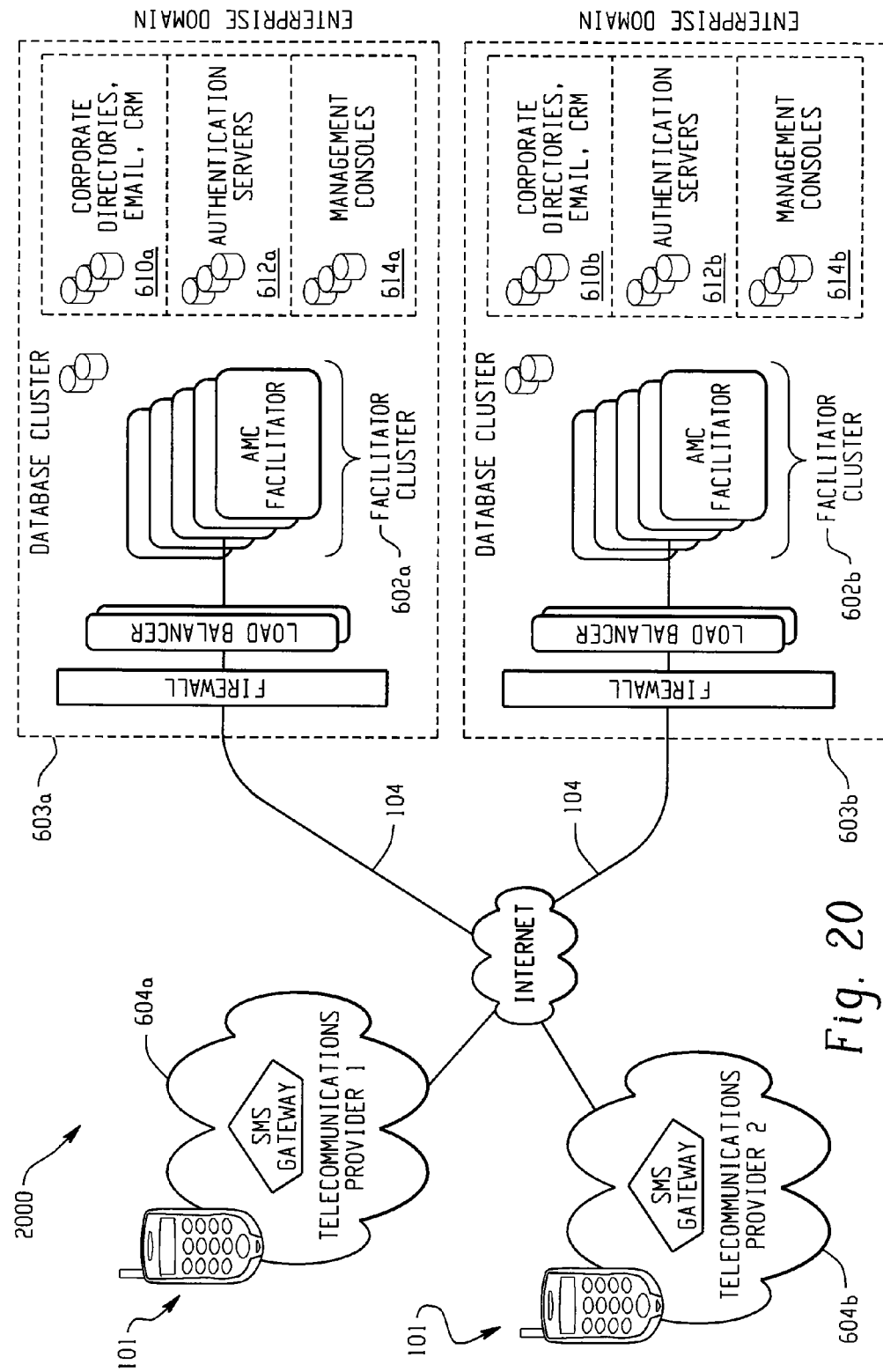
FIG. 20 is a block diagram of an AMC system in an enterprise domain, under still another alternative embodiment.

FIG. 20 is a block diagram of an AMC system 2000 in an enterprise domain, under still another alternative embodiment. The AMC system 2000 includes one or more facilitators that form facilitator clusters 602a and 602b within each of a number of enterprise domains 603a and 603b. Facilitators of the facilitator clusters 602a and 602b communicate with one or more client devices 1001 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 21:
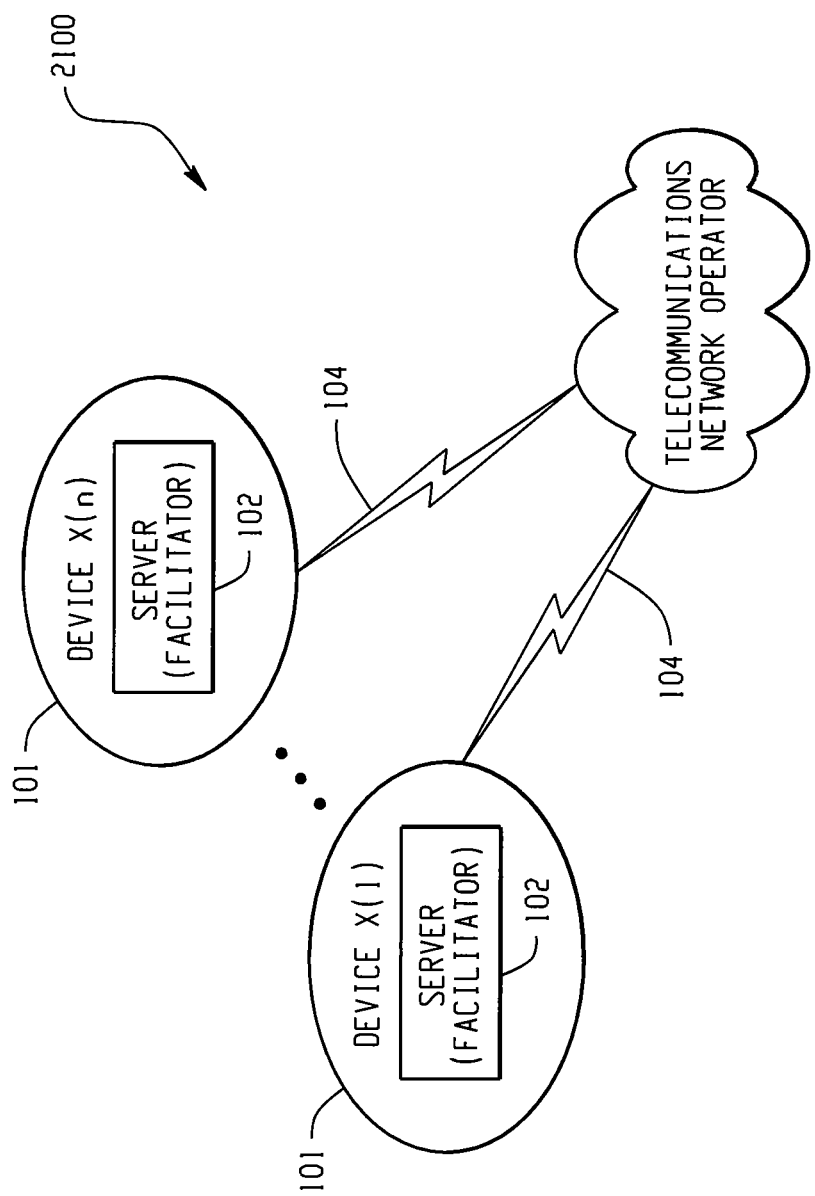
FIG. 21 is a block diagram of an active mobile collaboration (AMC) system, under an embodiment.

FIG. 21 is a block diagram of an active mobile collaboration (AMC) system 2100, under an embodiment. The AMC system 2100 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

The communication systems of an embodiment include a method comprising receiving information of a voicemail message from a voicemail system that is a server-based system of an enterprise. The voicemail message is received at the voicemail system. The method of an embodiment includes automatically synchronizing a state of the voicemail message between a mobile communication device and an access component of the voicemail system in response to changes in the voicemail message made via one or more of the mobile communication device and the access component.

Automatically synchronizing a state of an embodiment includes changing a state of the voicemail message at the mobile communication device and the access component in response to one or more of access of the voicemail message from the mobile communication device, access of the voicemail message from the access component, playback of the voicemail message from the mobile communication device, playback of the voicemail message from the access component, deletion of the voicemail message from the mobile communication device, and deletion of the voicemail message from the access component.

The method of an embodiment includes transmitting notification of the voicemail message to the mobile communication device.

The method of an embodiment includes transmitting notification of the voicemail message to the access component.

The notification of an embodiment includes initiating a conversation thread at the mobile communication device.

The notification of an embodiment includes an option to playback the voicemail message at the mobile communication device.

The playback of an embodiment includes downloading to the mobile communication device an audio file of the voicemail message. The playback of an embodiment includes playback of the voicemail message at the mobile communication device using the downloaded audio file.

The method of an embodiment includes changing a state of the voicemail message at the mobile communication device and the access component in response to the playback at the mobile communication device.

The playback of an embodiment includes a synchronous request-response file download mechanism between the mobile communication device and the voicemail system via a facilitator.

The facilitator of an embodiment receives a request for the voicemail message from the mobile communication device. The facilitator of an embodiment fetches the voicemail message from the voicemail system. The facilitator of an embodiment transfers an audio file including information of the voicemail message to the mobile communication device.

The method of an embodiment includes converting the audio file from a first format to a second format.

A client of the mobile communication device of an embodiment is configured to receive the audio file. The client of the mobile communication device of an embodiment is configured to store the audio file. The client of the mobile communication device of an embodiment is configured to generate an interface by which the audio file can be accessed for an operation. The operation includes one or more of playing, pausing, and rewinding the voicemail message.

The downloading of an embodiment includes downloading one or more of a partial voicemail message, a single voicemail message, and a plurality of voicemail messages.

The method of an embodiment includes storing on the mobile communication device one or more of the partial voicemail message, the single voicemail message, and the plurality of voicemail messages.

The downloading of an embodiment includes one or more of automatic downloading, downloading in response to user action, and downloading in response to a parameter. The parameter of an embodiment includes one or more of importance of the voicemail message, an originator of the voicemail message, and a network parameter of a communication network providing communications to the mobile communication device.

The playback of an embodiment includes fetching the voicemail message from the voicemail system. The playback of an embodiment includes storing the voicemail message at a facilitator.

The method of an embodiment includes generating at a client of the mobile communication device a command for the facilitator to link a telephone number to the voicemail message. The method of an embodiment includes transferring the telephone number to the client in response to the command.

The method of an embodiment includes initiating a telephone call between the client and the facilitator using the telephone number. The method of an embodiment includes transmitting the voicemail message from the facilitator to the client via the telephone call.

The method of an embodiment includes generating at a client of the mobile communication device a request to play the voicemail message. The method of an embodiment includes the facilitator initiating a telephone connection with the client in response to the request to play. The method of an embodiment includes the facilitator playing the voicemail message over the telephone connection.

The method of an embodiment includes receiving a delete input at the mobile communication device. The method of an embodiment includes deleting the voicemail message at the mobile communication device and the voicemail system in response to the delete input. The method of an embodiment includes changing a state of the voicemail message at the mobile communication device and the access component in response to the delete input.

The method of an embodiment includes changing a state of the voicemail message at the mobile communication device and the access component in response to access of the voicemail message from the mobile communication device.

The notification of an embodiment includes providing one or more of audio and visual indicators at the access component.

The method of an embodiment includes changing a state of the voicemail message at the mobile communication device and the access component in response to playback of the voicemail message initiated at the telephone.

The method of an embodiment includes changing a state of the voicemail message at the mobile communication device and the access component in response to access of the voicemail message initiated at the telephone.

The notification of an embodiment includes an option to automatically respond to the voicemail message from the mobile communication device.

The automatic response of an embodiment includes generation and transmission of an electronic message to the originator of the voicemail message.

The electronic message of an embodiment includes one or more of an electronic mail message, a text message, an instant message, a Short Message Service (SMS) message, a Multimedia Messaging Service (MMS) message, and an Enhanced Messaging Service (EMS) message.

The automatic response of an embodiment includes generation and transmission of a telephone call to the originator of the voicemail message.

The automatic response of an embodiment includes generating a call request to the originator of the voicemail message.

Generating the call request of an embodiment includes transferring the call request from the mobile communication device to a target device of the originator via a data coupling.

The method of an embodiment includes providing a delivery confirmation to the mobile communication device in response to delivery of the transferred call request to the target device.

The method of an embodiment includes generating a plurality of response options on the target device in response to receipt of the call request. The response options include at least one of accepting the call request, postponing the call request, generating a return data message including at least one of a text message and a voice message to the mobile communication device, and initiating the voice call.

The method of an embodiment includes generating a response message in response to selection of a response option at the target device and transferring the response message to the mobile communication device over the data coupling.

The method of an embodiment includes receiving a delete input at the access component. The method of an embodiment includes deleting the voicemail message at the mobile communication device and the voicemail system in response to the delete input. The method of an embodiment includes changing a state of the voicemail message at the mobile communication device and the access component in response to the delete input.

The method of an embodiment includes determining an identification of an originator of the voicemail message.

The method of an embodiment includes mapping originator information of the originator to an integrated directory, wherein the integrated directory includes contacts representing a set of contacts of a plurality of directories of the mobile communication device and the enterprise.

The mobile communication device of an embodiment operates external to the enterprise.

The mobile communication device of an embodiment operates internal to the enterprise.

The mobile communication device of an embodiment is one or more of an Internet Protocol (IP) telephone, WiFi device, cellular telephone, multi-mode telephone, wireless device, personal digital assistant, and Worldwide Interoperability for Microwave Access (WiMAX) device.

The access component of an embodiment includes a telephone coupled to a private branch exchange (PBX).

The access component of an embodiment includes a telephone coupled to a central exchange (Centrex).

The method of an embodiment includes displaying the information of the voicemail message on the mobile communication device.

The method of an embodiment includes displaying the state of the voicemail message on the mobile communication device.

The method of an embodiment includes displaying a voicemail control interface on the mobile communication device by which the audio file can be accessed for an operation. The operation of an embodiment includes one or more of playing, pausing, rewinding, fast-forwarding, deleting, and changing the state of the voicemail message. The operation of an embodiment includes responding to an originator of the voicemail message, wherein the responding includes one or more of generating and transmitting a telephone call, call request, electronic mail message, text message, instant message (IM), voice IM, Short Message Service (SMS) message, Multimedia Messaging Service (MMS) message, and Enhanced Messaging Service (EMS) message.

The method of an embodiment includes displaying information of the voicemail message of the enterprise on the client device. The information of the voicemail message of an embodiment includes one or more of an originator of the voicemail message, a length of the voicemail message, and a received time of the voicemail message.

The displaying of an embodiment is automatically performed in response to receipt of the voicemail message at the enterprise.

The method of an embodiment includes changing the state of the voicemail message at the mobile communication device to an expired state after a first period of time has elapsed following transmission to the mobile communication device of a notification of the voicemail message.

The method of an embodiment includes displaying the voicemail message as an expired conversation at the mobile communication device.

The notification of an embodiment includes an option to playback the voicemail message at the mobile communication device. The playback of the voicemail message of an embodiment in an expired state can be initiated using information of the notification.

The method of an embodiment includes deleting the notification from the mobile communication device after a second period of time has elapsed following transmission of the notification.

The communication systems of an embodiment include a method comprising transmitting voicemail information of a voicemail message to a client device. The voicemail message is received at a voicemail system that is a server-based system of an enterprise. The method of an embodiment includes displaying the voicemail information at the client device. The method of an embodiment includes automatically synchronizing a state of the voicemail information between the client device and an access component of the voicemail system in response to changes in the voicemail message made via one or more of the mobile communication device and the access component.

The communication systems of an embodiment include a method comprising receiving a voicemail message in a voicemail system. The voicemail system is a server-based system of an enterprise. The method of an embodiment includes transmitting notification of the voicemail message to a remote device and an access device of the voicemail system. The method of an embodiment includes automatically maintaining an accurate state of the message at the remote device and the access device. The accurate state reflects changes in the voicemail message made via one or more of the remote device and components of the voicemail server system.

The communication systems of an embodiment include a system comprising a voicemail system coupled to an enterprise and configured to receive and store a voicemail message. The system of an embodiment includes a server coupled to at least one communication network. The system of an embodiment includes at least one adapter coupled to the server and the voicemail system. The adapter is configured to automatically synchronize a state of the voicemail message between a mobile communication device external to the enterprise and an access component of the voicemail system in response to changes in the voicemail message made via one or more of the mobile communication device and the access component.

The adapter of an embodiment is coupled to at least one database of the voicemail system, wherein the adapter is configured for a type of the database.

The database of an embodiment is coupled to a voicemail server of the enterprise.

The database of an embodiment is coupled to a plurality of voicemail servers of the enterprise.

The voicemail servers of an embodiment comprise a plurality of voicemail configurations.

The adapter of an embodiment is coupled to at least one component of the server. The at least one component of an embodiment is one or more of a calendar component, an electronic mail component, and a contacts component. The at least one component of an embodiment is a voicemail component that is configured for one or more of a type and configuration of the voicemail system. The voicemail component of an embodiment is independent of the voicemail system.

The at least one adapter of an embodiment includes a plurality of adapters.

The adapters of an embodiment include a first set of adapters coupled to a voicemail component of the server. The voicemail component of an embodiment is configured for one or more of a type and configuration of the voicemail system. The voicemail component of an embodiment is independent of the voicemail system.

Each adapter of the first set of an embodiment is coupled a database of the voicemail system. The adapter of an embodiment is configured for a type of the database to which it is coupled.

The database of an embodiment is coupled to a voicemail server of the enterprise.

The database of an embodiment is coupled to a plurality of voicemail servers of the enterprise. The plurality of voicemail servers of an embodiment comprises a plurality of voicemail configurations.

An adapter of the first set of an embodiment is coupled to a proprietary database of the voicemail system, wherein the proprietary database is proprietary to a voicemail server to which it is coupled, wherein the adapter is configured to interface with the proprietary database. The adapter of an embodiment is configured to support Internet Message Access Protocol (IMAP) version 4 (IMAP4).

An adapter of the first set of an embodiment is connected to a voicemail server of the voicemail system, wherein the adapter is a proprietary adapter that is proprietary to a voicemail server to which it is coupled. The voicemail server of an embodiment includes an embedded database.

The system of an embodiment includes a second adapter coupled to the server and one or more of a calendar and contacts system of the enterprise. The second adapter of an embodiment is configured to automatically synchronize a state of calendar and contacts information between a mobile communication device external to the enterprise and an access component of the enterprise in response to changes in the calendar and contacts information made via one or more of the mobile communication device and the access component. The second adapter of an embodiment is coupled to a calendar and contacts component of the server.

The calendar and contacts component of the server of an embodiment is configured for one or more of a type and configuration of the calendar and contacts system of the enterprise. The calendar and contacts component of an embodiment is independent of the calendar and contacts system of the enterprise.

The communication systems of an embodiment include a computer readable media including executable instructions which, when executed in a processing system, provides visual voicemail by receiving information of a voicemail message from a voicemail system that is a server-based system of an enterprise. The voicemail message is received at the voicemail system. The instructions of an embodiment, when executed, automatically synchronize a state of the voicemail message between a mobile communication device and an access component of the voicemail system in response to changes in the voicemail message made via one or more of the mobile communication device and the access component.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, software, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems are not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method comprising:
   receiving information of an audio voicemail message from a voicemail system that is a server-based system of an enterprise, wherein the voicemail message is received by an access component at the voicemail system;
   automatically sending a digitized copy of the voicemail message to a mobile communication device for storing on the mobile communication device in an audio playback format compatible thereto;
   displaying, on the mobile communication device, data indicative of a presence of the voicemail message stored thereon;
   receiving data representative of playing back the copy of the voicemail on the mobile communication device from the mobile communication device;
   automatically synchronizing a state of the voicemail message between the mobile communication device and the voicemail system in response to changes in the voicemail message made via the mobile communication device;
   automatically synchronizing a state of the voicemail message between the mobile communication device and the voicemail system in response to a change associated with the voicemail message made via the voicemail system; and
   wherein automatically synchronizing the state of the voice mail message comprises changing the state of the voicemail message at the voicemail system from unread to read responsive to receiving data representative of playing back the copy of the voicemail on the mobile communication device and changing the state of the voicemail message reflected on the mobile communication device responsive to a change associated with the voicemail message made via the voicemail system.

2. The method of claim 1, wherein automatically synchronizing a state includes changing a state of the voicemail message at the mobile communication device and the access component in response to one or more of access of the voicemail message from the mobile communication device, access of the voicemail message from the access component, playback of the voicemail message from the mobile communication device, playback of the voicemail message from the access component, deletion of the voicemail message from the mobile communication device, and deletion of the voicemail message from the access component.

3. The method of claim 1, wherein the voicemail message is stored in an audio file, the method further comprising converting the audio file from a first format stored at the access component of the voicemail system to a second format compatible with the mobile communication device.

4. The method of claim 1, comprising: receiving a delete input at the mobile communication device;

deleting the voicemail message at the mobile communication device and the voicemail system in response to the delete input; and changing a state of the voicemail message at the mobile communication device and the access component in response to the delete input.

5. The method of claim 1, comprising changing a state of the voicemail message at the mobile communication device and the access component in response to access of the voicemail message from the mobile communication device.

6. The method of claim 1, wherein the notification includes providing one or more of audio and visual indicators at the access component.

7. The method of claim 6, comprising changing a state of the voicemail message at the mobile communication device and the access component in response to playback of the voicemail message initiated at the telephone.

8. The method of claim 6, comprising changing a state of the voicemail message at the mobile communication device and the access component in response to access of the voicemail message initiated at the telephone.

9. The method of claim 1, wherein the notification includes an option to automatically respond to the voicemail message from the mobile communication device.

10. The method of claim 9, wherein the automatic response includes generation and transmission of an electronic message to the originator of the voicemail message.

11. The method of claim 10, wherein the electronic message includes one or more of an electronic mail message, a text message, an instant message, a Short Message Service (SMS) message, a Multimedia Messaging Service (MMS) message, and an Enhanced Messaging Service (EMS) message.

12. The method of claim 9, wherein the automatic response includes generation and transmission of a telephone call to the originator of the voicemail message.

13. The method of claim 9, wherein the automatic response includes generating a call request to the originator of the voicemail message.

14. The method of claim 13, wherein generating the call request includes transferring the call request from the mobile communication device to a target device of the originator via a data coupling.

15. The method of claim 14, comprising providing a delivery confirmation to the mobile communication device in response to delivery of the transferred call request to the target device.

16. The method of claim 15, comprising generating a plurality of response options on the target device in response to receipt of the call request, wherein the response options include at least one of accepting the call request, postponing the call request, generating a return data message including at least one of a text message and a voice message to the mobile communication device, and initiating the voice call.

17. The method of claim 16, comprising generating a response message in response to selection of a response option at the target device and transferring the response message to the mobile communication device over the data coupling.

18. The method of claim 1, comprising:
receiving a delete input at the access component; deleting the voicemail message at the mobile communication device and the voicemail system in response to the delete input; and
changing a state of the voicemail message at the mobile communication device and the access component in response to the delete input.

19. The method of claim 1, comprising determining an identification of an originator of the voicemail message.

20. The method of claim 19, comprising mapping originator information of the originator to an integrated directory, wherein the integrated directory includes contacts representing a set of contacts of a plurality of directories of the mobile communication device and the enterprise.

21. The method of claim 1, wherein the mobile communication device operates external to the enterprise.

22. The method of claim 1, wherein the mobile communication device operates internal to the enterprise.

23. The method of claim 1, wherein the mobile communication device is one or more of an Internet Protocol (IP) telephone, WiFi device, cellular telephone, multi-mode telephone, wireless device, personal digital assistant, and Worldwide Interoperability for Microwave Access (WiMAX) device.

24. The method of claim 1, wherein the access component includes a telephone coupled to a private branch exchange (PBX).

25. The method of claim 1, wherein the access component includes a telephone coupled to a central exchange (Centrex).

26. The method of claim 1, comprising displaying a voicemail control interface on the mobile communication device by which the audio file can be accessed for an operation.

27. The method of claim 26, wherein the operation includes one or more of playing, pausing, rewinding, fast-forwarding, deleting, and changing the state of the voicemail message.

28. The method of claim 26, wherein the operation includes responding to an originator of the voicemail message, wherein the responding includes one or more of generating and transmitting a telephone call, call request, electronic mail message, text message, instant message (IM), voice IM, Short Message Service (SMS) message, Multimedia Messaging Service (MMS) message, and Enhanced Messaging Service (EMS) message.

29. The method of claim 1, comprising displaying information of the voicemail message of the enterprise on the client device, the information of the voicemail message including one or more of an originator of the voicemail message, a length of the voicemail message, and a received time of the voicemail message.

30. The method of claim 29, wherein the displaying is automatically performed in response to receipt of the voicemail message at the enterprise.

31. The method of claim 1, comprising changing the state of the voicemail message at the mobile communication device to an expired state after a first period of time has elapsed following transmission to the mobile communication device of a notification of the voicemail message.

32. The method of claim 31, comprising displaying the voicemail message as an expired conversation at the mobile communication device.

33. The method of claim 31, wherein the notification includes an option to playback the voicemail message at the mobile communication device, wherein the playback of the voicemail message in an expired state can be initiated using information of the notification.

34. The method of claim 31, comprising deleting the notification from the mobile communication device after a second period of time has elapsed following transmission of the notification.

35. A non-transitory computer readable media including executable instructions which, when executed in a processing system, provides visual voicemail by:

receiving information of an audio voicemail message from a voicemail system that is a server-based system of an enterprise, wherein the voicemail message is received at the voicemail system;

automatically sending a digitized copy of the voicemail message to a mobile communication device for storage at the mobile communication device in an audio playback format compatible thereto;

displaying, on the mobile communication device, data indicative of a presence of the voicemail message stored thereon;

receiving data representative of playing back the copy of the voicemail on the mobile communication device from the mobile communication device; and automatically synchronizing a state of the voicemail message between the mobile communication device and an access component of the voicemail system in response to changes in the voicemail message made via the mobile communication device;

automatically synchronizing a state of the voicemail message between the mobile communication device and the voicemail system in response to a change associated with the voicemail message made via the voicemail system; and wherein automatically synchronizing the state of the voicemail message comprises changing the status of the voicemail message at the voicemail system to read responsive to receiving data representative of playing back the copy of the voicemail on the mobile communication device and changing the state of the voicemail message reflected on the mobile communication device responsive to a change associated with the voicemail message made via the voicemail system.

* * * * *